United States Patent [19]
Vitols et al.

[11] 4,187,519
[45] Feb. 5, 1980

[54] SYSTEM FOR EXPANDING THE VIDEO CONTRAST OF AN IMAGE

[75] Inventors: Visvaldis A. Vitols, Orange; Stanley A. White, Santa Ana, both of Calif.

[73] Assignee: Rockwell International Corporation, El Segundo, Calif.

[21] Appl. No.: 934,657

[22] Filed: Aug. 17, 1978

[51] Int. Cl.² .............................................. H04N 5/14
[52] U.S. Cl. ..................................... 358/169; 358/160
[58] Field of Search ......................... 358/160, 162, 169

[56] References Cited
U.S. PATENT DOCUMENTS
4,069,505  1/1978  Burdick et al. ...................... 358/162

Primary Examiner—Richard Murray
Attorney, Agent, or Firm—L. Lee Humphries; H. Fredrick Hamann; Rolf M. Pitts

[57] ABSTRACT

A system, and method, is disclosed for substantially increasing the dynamic range of contrast of an input sequence of pixels representative of an image. In a preferred embodiment a first circuit is responsive to an input sequence of pixels representative of an image for developing bias and gain parameters. These bias and gain parameters are respectively utilized by first and second function generators to generate bias correction signals and gain correction signals, respectively. A delay circuit delays the input sequence of pixels to synchronize said input sequence with the bias correction signals and the gain correction signals. A first expansion circuit expands in a first direction the range of contrast of the delayed input sequence of pixels as a function of the bias correction signals to produce a first contrast expanded sequence of pixels. A second expansion circuit expands in a second direction the range of contrast of the first contrast expanded sequence of pixels as a function of the gain correction signals to produce an output sequence of pixels which has a substantially expanded dynamic range of contrast in relation to the dynamic range of contrast of the input sequence of pixels.

8 Claims, 20 Drawing Figures

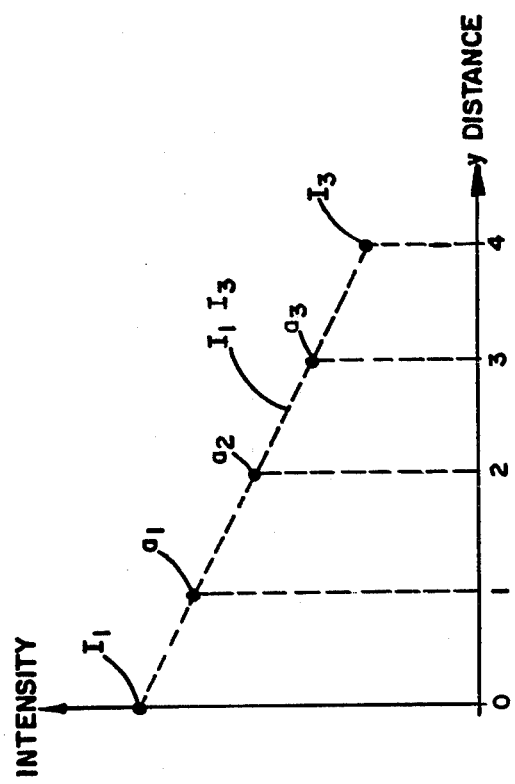
FIG.17
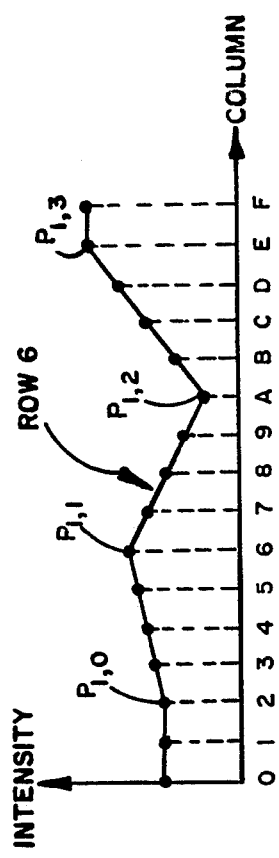
FIG.19
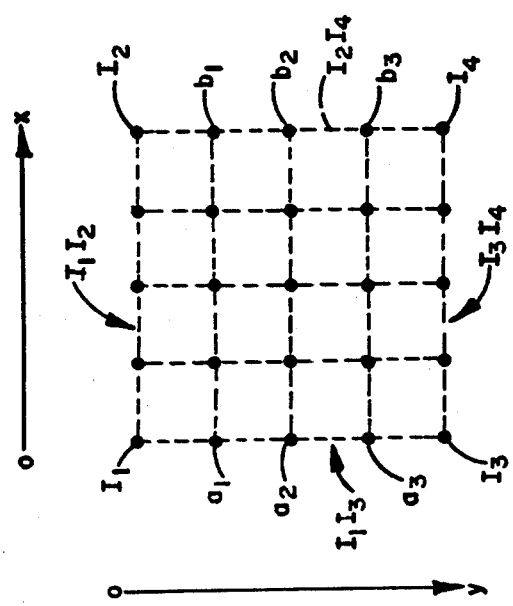
FIG.16
FIG.18

SYSTEM FOR EXPANDING THE VIDEO CONTRAST OF AN IMAGE

BACKGROUND OF THE INVENTION

1. Field of the Invention

This invention relates to varying the video contrast of a video image and particularly to a system and method for automatically increasing the dynamic range of contrast of an input sequence of pixels or data points representative of a video image.

2. Prior Art Statement

In the art of video display systems, limitations occur in the quality of the video signal display. One source of these limitations may occur in the display circuits themselves, which may be subjected to video signals of a dynamic range beyond that of the video equipment: weak video signals may fall below a limited threshold as to be denied processing for display, while other signal portions may saturate the system. Another source of display signal limitation may be due to the poor quality of the signal itself, whereby increased gray-tone discrimination is desired in order to obtain adequate image detail intelligence from the video signal display.

Various systems and means have been proposed in the prior art for the enhancement of video signals. An early effort in this regard is set forth in U.S. Pat. No. 3,257,506 to Siepmann for controlling the contrast in television video signals, in which contrast control is applied to a selected portion or area of the video display image by means of a contrast control signal applied to either a sensitivity control circuit of the TV camera system or an electrode of the display tubes.

Such analog system, in being directed to only a portion of an entire image field and being developed from a separate, limited field of view scanner, does not provide enhancement over an entire field of view. Also, because the control voltage is derived as a function of the average video signal level over the selected partial field of view, such scheme does not lend itself to controlling image contrast over an entire field of view, especially one displaying a wide dynamic range of video signals.

Two, more-recent, references in the art of video signal enhancement are U.S. Pat. No. 3,983,320 to Ketchem et al for Raster Display Histogram Equalization and U.S. Pat. No. 3,996,421 to Pruznick et al for Television Display Utilizing Local Area Brightness Control. These references operate directly upon the video data without the use of auxiliary scanners or modification of the image sensor or TV camera.

Ketchem U.S. Pat. No. 3,983,320 teaches a digital system which performs video equlization on a local area or sliding window basis. The intensity of a given pixel or point in the image is adjusted according to a histogram of the area contained in a window surrounding this point. As the window is moved across the image field, the process is repeated for points within the window. Mini-histograms or sub-histograms are employed to provide statistical data, from which multiple truncation maps are formed. Such truncated video data provides enhanced gray level contrast over all portions of the picture image, regardless of the general brightness or darkness level of particular portions of the image. Such increased gray level contrast is provided by means of increased numbers of intensity levels within local areas of minimum contrast. In this way the overall image contrast for dark, gray or bright level areas is enhanced. However result is achieved at the expense of a substantially complex mechanization, including reliance upon a large number of multiplications.

Pruznick U.S. Pat. No. 3,996,421 uses a "sliding window" similarly as Ketchem U.S. Pat. No. 3,983,320, but does not employ the truncated histogram. Instead, Pruznick determines the average image intensity within the window at a given time, and enhances the intensity differences between given pixels or points therein and such average. Such enhancement or equalization is performed by both adjusting the gain of such differences and biasing the level of such intensity. In this way, an overly bright area is made less bright and the contrast therein improved within the dynamic limits of the display, a dark area is brightened and its contrasts enhanced, and gray areas subjected to contrast improvement with little or no bias adjustment in average brightness. However, Pruznick, like Ketchem, employs a complex mechanization relying upon a large number of multiplications.

Accordingly, a disadvantage of the prior art digital processing for image contrast enhancement has been the reliance upon complex modes of mechanization relying on large numbers of multiplications, as to increase equipment cost, reduce system reliability and adversely affect system processing speeds.

SUMMARY OF THE INVENTION

Briefly a system is provided for substantially increasing the dynamic range of contrast of an input sequence of pixels representative of an image. A first circuit develops from the input sequence of pixels, bias parameters and gain parameters without resort to multiplication or the use of multiplier devices. These bias and gain parameters are in turn, respectively converted by second and third circuits into bias correction and gain correction signals. The input sequence of pixels is appropriately delayed before being applied to a first contrast expansion circuit, which develops a first expanded signal by expanding the range of contrast of the delayed input sequence of pixels in a first direction as a function of the bias correction signals. A second contrast expansion circuit further expands the range of contrast of the first expanded signal in a second direction as a function of the gain correction signals.

It is therefore an object of this invention to provide an improved video contrast expansion system.

Another object of this invention is to provide a system and method for automatically varying the range of contrast of a video image in first and second directions as functions of first and second correction signals derived by double linear interpolations from first and second parameter signals extracted from the video image.

Another object of this invention is to extract the associated minimum and maximum values of intensities in each of a plurality of local regions of a video image and then expand the range of intensities in each local region as functions of the associated minimum and maximum values of intensities found in said local region.

A further object of this invention is to increase the dynamic range of contrast of an input sequence of pixels representative of an image as a function of first and second parameters non-multiplicatively extracted from the input sequence of pixels.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein:

FIG. 16 illustrates a typical macro cell which is bounded at its four corners by received pixels;

FIG. 17 illustrates the vertical line $I_1I_3$ of intensity points on the left-hand side of the macro cell of FIG. 16;

FIG. 18 illustrates how the received intensity points of a macro cell are also used in conjunction with the shading in of adjacent cells;

FIG. 19 illustrates the graduation fluctuations in the intensities of the picture points that lie along row or line 6 of FIG. 13 (or FIG. 14)

DESCRIPTION OF THE PREFERRED EMBODIMENT

Figure 1:
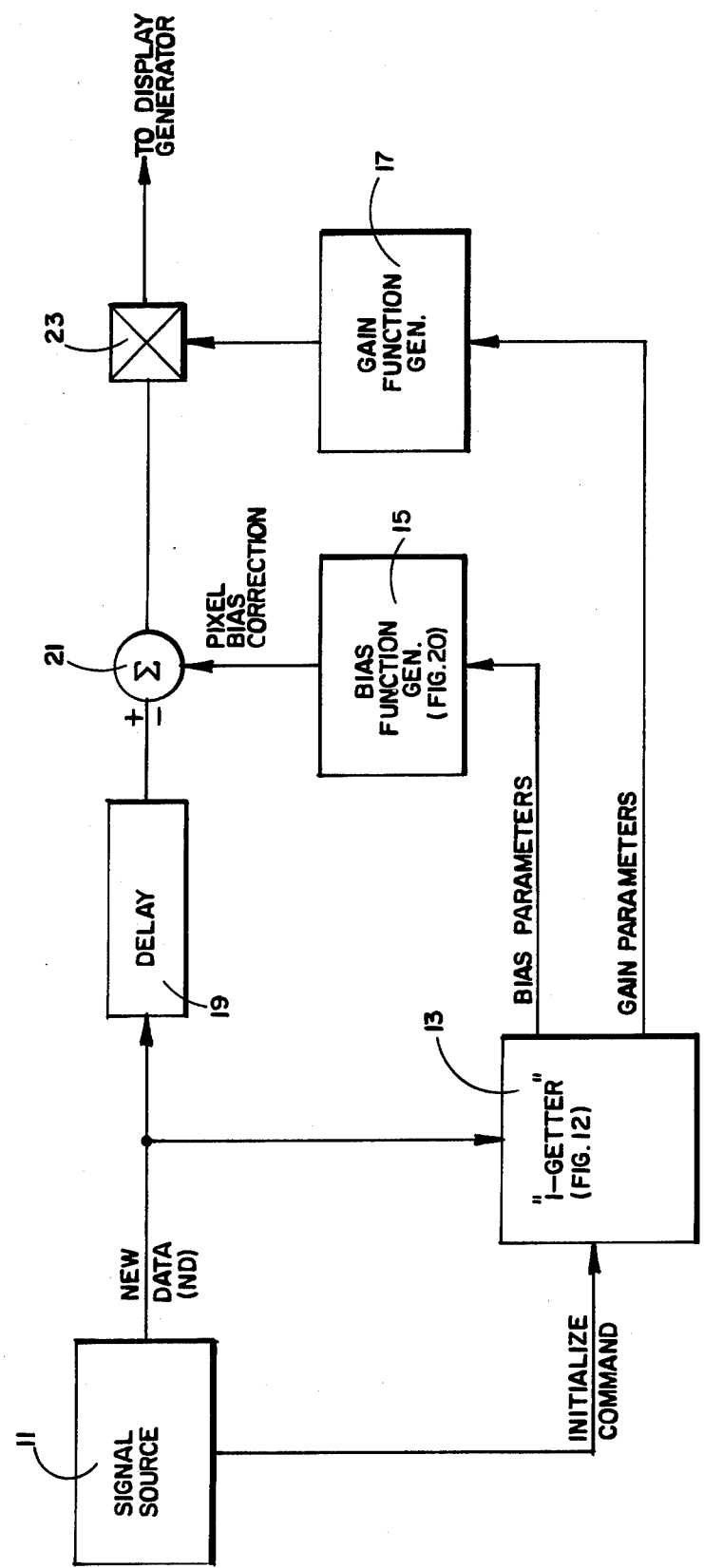
FIG. 1 is a simplified block diagram of the invention.

Reference is now made to FIG. 1 which is a schematic block diagram of the system of the invention. A sequence of video pixel data representative of an image is developed by a signal source 11, which may be, for example, a radar, an IR (infrared) sensor or a TV (television) camera. This pixel data, or sequence of pixels, which may be in a digitized form, is applied to an I-getter (intensity getter) 13 and to a delay circuit 19. An initialize command signal from the source 11 initializes the operation of the I-getter 13 before or during the time that the sequence of pixels is being generated by the source 11.

The I-getter 13 searches the input sequence of pixels (designated as new data or ND) to determine bias and gain intensity parameters. A bias function generator 15 is automatically adjusted by the bias parameters to develop pixel bias correction signals. In a similar manner a gain function generator 17, which is similar in structure and operation to the generator 15, is automatically adjusted by the gain parameters to develop pixel gain correction signals.

In its operation the I-getter 13 reduces and transforms the input sequence of pixels into a reduced number of bias parameters and a reduced number of gain parameters. Each of the function generators 15 and 17 smoothly fills in or shades in its associated widely spaced apart parameters (bias or gain) by double linear interpolations to produce its associated correction signals (bias or gain). Each sequence of correction signals is equal to the number of pixels in the input sequence of pixels.

It takes time for each of the function generators 15 and 17 to get sufficient parameter data in before it can start computing its associated correction signals. Furthermore, it takes additional time before each of the function generators 15 and 17 compute its associated correction signals. This combined delay time is offset by the delay circuit 19 which synchronizes the time of occurrence of the sequence of pixels at the output of the delay circuit 19 with the time of generation of the pixel bias correction signals and pixel gain correction signals.

The computed pixel bias correction signals are respectively subtracted in a combiner or subtractor 21 from the delayed or synchronized sequence of pixels to selectively lower the minimum values in associated groups of pixels in the delayed sequence of pixels to very close to zero. The minimized output of the combiner 21 is respectively multiplied in a multiplier or AGC (automatic gain control) circuit 23 to selectively expand the maximum amplitudes in the associated groups of pixels at the output of the combiner 21 to near the saturation level of the electronics of the system of FIG. 1. The output of the AGC circuit 23 can be applied to a display generator (not shown) to generate an enhanced picture of the image in which the video contrast of the image has been substantially expanded in two directions (minimum and maximum values of contrast).

The pixel data at the output of the signal source 11 may have a very narrow dynamic range of contrast, making it extremely difficult to discern objects in areas of lower contrast if directly viewed at the point. However, by the operation just explained, the pixel data at the output of the AGC circuit 23 has its dynamic range of contrast selectively expanded or stretched from near minimum to near maximum, making objects originally in low areas of contrast now clearly discernable when displayed.

To clarify this operation of expanding the dynamic range of contrast in two different directions for a two-dimensional image, reference will be made to FIGS. 2-11. FIGS. 2-11 illustrate some of the possible operations that can be performed on a one-dimensional signal. Such operations are analogous to those performed on a two-dimensional signal, since a two-dimensional signal is essentially comprised of a vertical plurality of horizontal one-dimensional signals.

Figure 2:
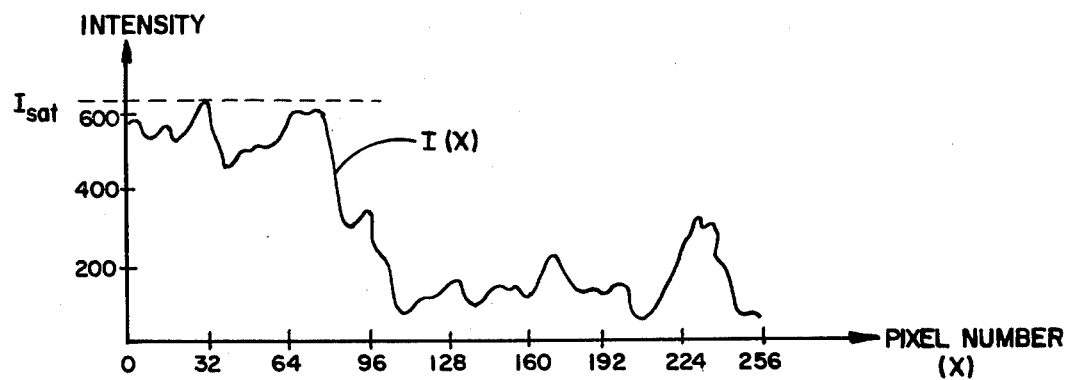
FIGS. 2-11 illustrate waveforms useful in explaining the general operation of the invention.

FIG. 2 illustrates an exemplary one-dimensional signal I(x) comprised of a sequence of 256 pixels. Although I(x) is shown as an analog signal, it is a sequence of 256 intensity (I) points of varying amplitudes. Note that I(x) varies over a fairly wide intensity range from an amplitude of 630 ($I_{sat}$ or the intensity saturation level of the system) to an amplitude of about 50 at the low end.

It may be desired in some applications to look for small, rather than large, amplitude deviations from nominal. For example, if the intensity variations in the incoming signals I(x) of FIG. 2 represent pixels or intensity points of a scene, very high intensity portions of I(x) would ultimately develop very bright portions in a picutre, and very low intensity portions of I(x) would ultimately develop very dark portions of the picture. However, a human observer or operator may not necessarily be interested in very high or very low intensity levels in the incoming signal I(x). Rather, an observer may only be interested in small variations of intensity in I(x), whether contained in very high, very low and/or intermediate levels of intensity in I(x). This is due to the fact that the small variations of intensity in I(x) can define the details of a scene or image sufficiently to possibly enable an observer to identify what is happening or contained in the picture.

By using a conventional contrast enhancement technique, an observer may be unable to discern what is contained in picture areas of small intensity variations. It is to the correction of this problem that the present invention is directed. To illustrate, assume that the low intensity region of pixels between 100 and 200 in FIG. 2 represents the signal that is coming from the inside of a dark cave. The brightest pixel in the 100–200 region of pixels is dark in comparison with the other high intensity or bright pixels in FIG. 2. An observer may be looking for the glint of light on a gun barrel inside that cave. If the dynamics of the signal in that 100–200 pixel region remain unchanged, an observer would not be able to see that glint of light on that gun barrel. However, if the gain of the signal in the 100–200 pixel region (where the amplitude of the signal is very low) could be increased so that variations of the signal show up to substantially the fullest extent possible without saturating the electronics of FIG. 1, the human observer could more readily determine what was inside the cave. It should be noted that a resultant picture would not look like a normal picture since the inside of the cave would be just as bright as what surrounds the cave on the outside. However, the application of the present invention is to brighten everything to the fullest dynamic range, so that an observer can see what is happening or contained in a resultant picture.

Figure 3:
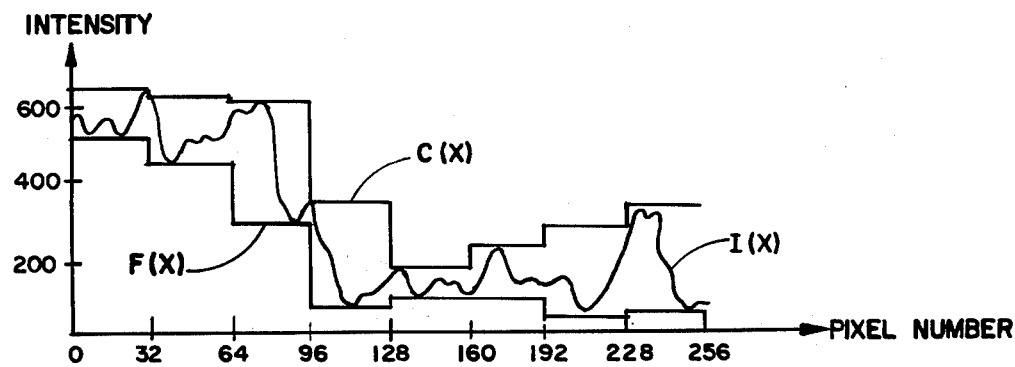

FIG. 3 illustrates a possible guide as to what may be done to increase the dynamic range of I(x) of FIG. 2. As shown, FIG. 3 illustrates a plurality of eight local data regions, each 32 pixels in length, which respectively encompass contiguous 32-pixel long portions of I(x). It should be understood that the length of a local data region, as well as the number of local data regions, shown here are for illustrative purposes, and other appropriate values could be used.

In each data region the brightest (or largest intensity) and darkest (or smallest intensity) parts of the associated portion of I(x) are determined. The largest and smallest intensity values found in each data region are used to form horizontal ceiling (C) and floor (F) values for each pixel across that region. Thus, the sequence of ceiling values found in the respective data regions forms a ceiling function of X values, designated C(c), while the sequence of floor values found in the respective data regions forms a floor function of X values, designated F(x), for the included portions of I(x).

Figure 4:
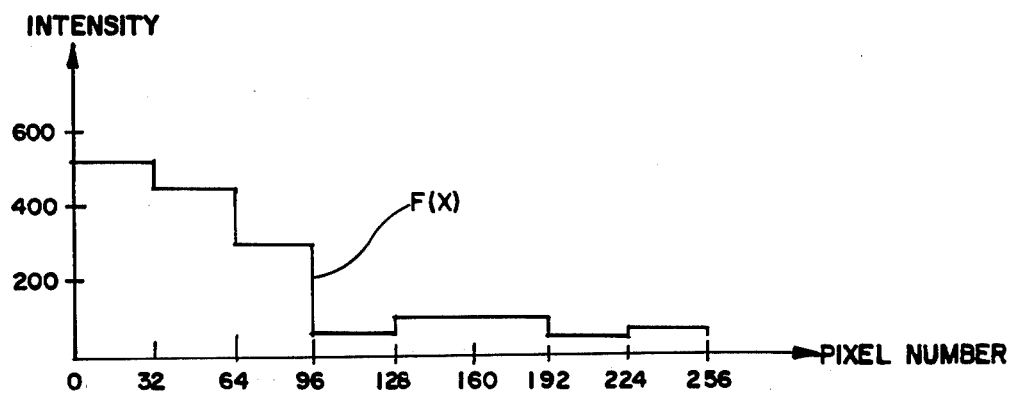

FIG. 4 shows just F(x) the floor function of FIG. 3. As shown, F(x) is comprised of the segmented sequence of minimum values across the respective regions of FIG. 3.

Figure 5:
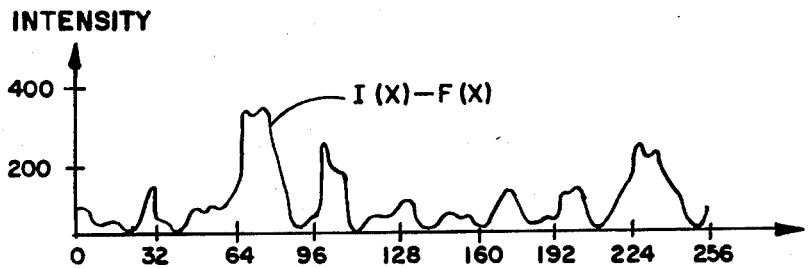

A first possible operation that can be performed to maximize the dynamic range of I(x) is to subtract F(x) from I(x) to produce the waveform shown in FIG. 5. To illustrate, the minimum value of F(x) in the first data region (0–32) of FIG. 3 is subtracted from the value of each pixel of the signal I(x) in the first data region. This subtraction is effectively the same as sliding down all of the signal I(x) in the first data region until the minimum or floor value of the first data region has a zero amplitude. In a similar manner, the floor value of the second data region (32–64) of FIG. 3 is subtracted from each of the pixel values of I(x) in the second region to reduce the minimum value of the second region to a zero amplitude. The same operation can be performed on each of the remaining data regions to produce the wave form shown in FIG. 5. It can be seen in FIG. 5 that the amplitude of the signal I(x) of FIG. 2 (or FIG. 3) is substantially reduced, while still substantially retaining the intensity variations of FIG. 2.

Figure 6:
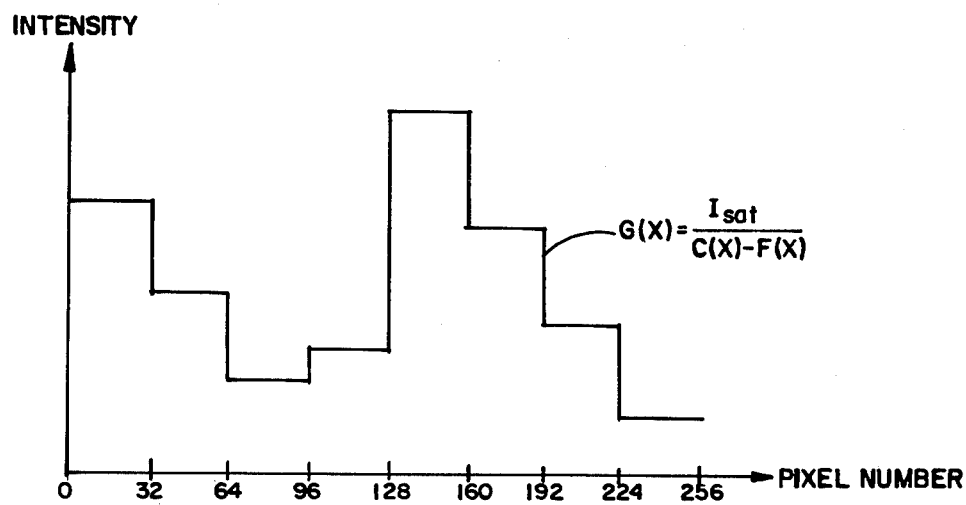

The next possible operation that can be performed is to expand the amplitude of the signal I(x)−F(x) of FIG. 5 by adjusting the gain in the first data region (0–32), second data region (32–64), third data region (64–96) etc.—each gain adjustment being independent of the others—so that the maximum value of the signal in each data region would go all the way up to the maximum permissible level or saturation level ($I_{sat}$). FIG. 6 illustrates a piece wise constant gain function G(x) that would independently adjust the maximum amplitude in each segment or data region up to the saturation level. This piecewise constant gain function would be determined by the value of the saturation intensity ($I_{sat}$) divided by the difference between the C(x) and F(x) functions.

Figure 7:
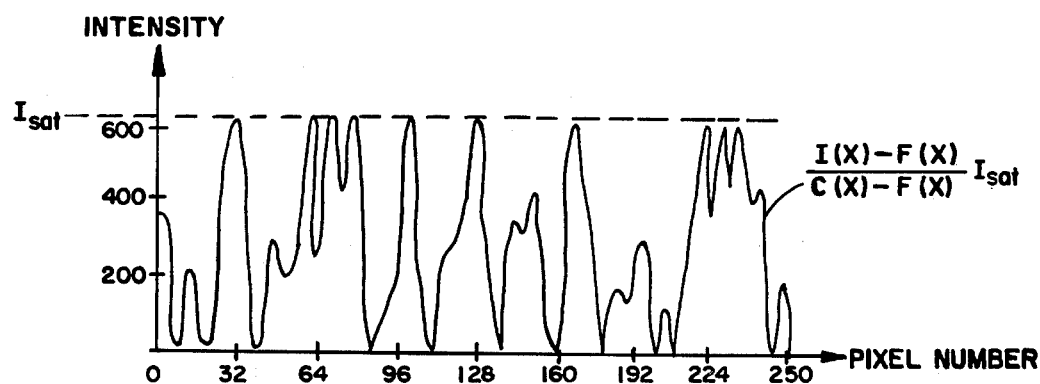

FIG. 7 illustrates the result of multiplying the function of FIG. 5 by the gain function of FIG. 6. This multiplication raises the maximum value in each data region up to the saturation level. However, FIG. 7 is very unsatisfactory because of the discontinuities, or, places where the amplitude of the signal rises or falls vertically. Although the full dynamic range of the signal is obtained in each data region, the resultant signal shown in FIG. 7 is very bumpy. So the overall information that an operator may be looking for in the signal may be totally lost in the discontinuities. If the one-dimensional waveform of FIG. 7 were applied to a two-dimensional picture, a very strong checkerboard pattern would result, which would distort the operator's perception of a picture or image to the point where he probably could not discern what he was looking at.

The discontinuities shown in FIG. 7 can be eliminated by smoothing the signal functions F(x) and G(x) from one data region to another. This smoothing operation is accomplished as explained below.

Figure 8:
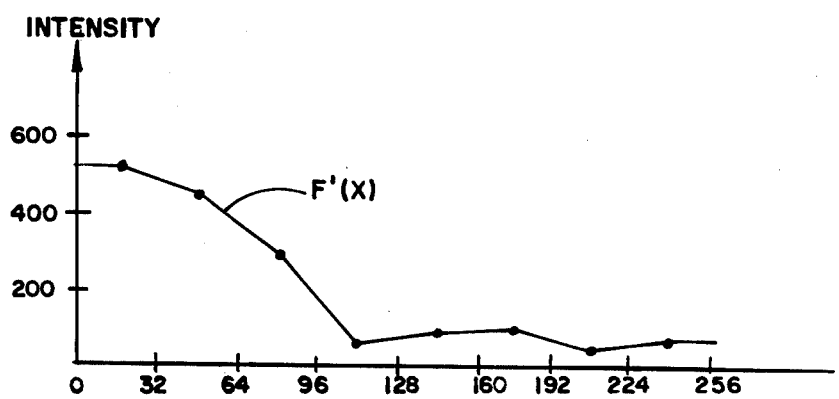
Figure 9:
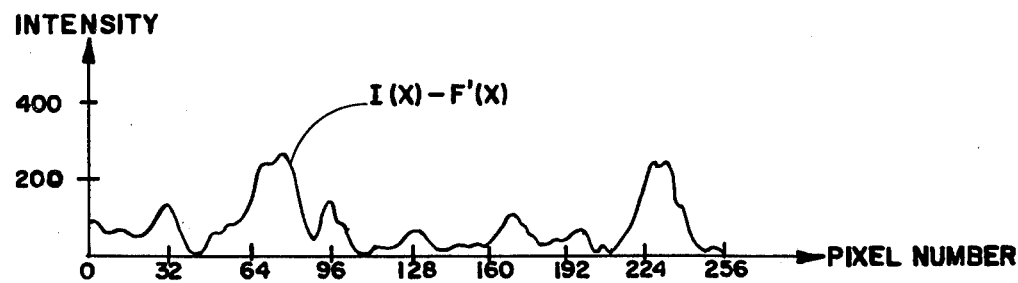

A new floor function F'(x) is generated from the floor function F(x) of FIG. 4. In FIG. 4 the midpoint is determined for each data region of F(x). The midpoints of adjacent data regions of F(x) are connected together by straight lines to yield the new floor function F'(x) shown in FIG. 8. The floor function F'(x) can also be called a bias function. Notice that F'(x) is a smooth floor function which does not contain any discontinuities. Such a smooth floor function F'(x) extending from the middle of one data region to the middle of the following data region, etc. can be defined by the following equation:

$$F(x) = \frac{I_{2(min.)} - I_{1(min.)}}{32}(X - 16) + I_{1(min.)}$$

where:

$I_{2(min.)}$ = minimum intensity value in the second data region $I_{1(min.)}$ = minimum intensity value in the first data region 32 = the number of pixels in each data region x − 16 = the midpoint position in any given data region FIG. 9 results when the new floor function F'(x) of FIG. 8 is subtracted from the original I(x) function of FIG. 2. There is one undesirable thing shown in FIG. 9. Since negative intensities are not used, there are a few places where the function F'(x) goes to zero. So some, but not much, negative saturation is shown in FIG. 9.

Since the maximum intensity level ($I_{sat}$) is far above the signal levels shown in FIG. 9 for the function I(x)−F'(x), the gain of the function of FIG. 9 can be substantially increased. The same type of operation that was used in defining the new floor or bias function F'(x) can be used in defining a new gain function G'(x). By this means the amplitude of the resulting function of FIG. 9 can be expanded all the way up to the maximum allowable level, but in a smooth fashion.

The new gain function G'(x) is generated from the gain function G(x) of FIG. 6. In FIG. 6 the midpoint is determined for each data region of G(x). The midpoints of the piece wise constant gain in adjacent data regions of G(x) are connected together by straight lines to yield the new gain function G'(x) shown in FIG. 10. Notice that, while these straight lines do not quite form a smooth curve, they establish a gain function free of discontinuities.

An expression for the gain of a data region, such as the $I_{2(gain)}$ for the second data region, can be defined by the following expression:

$$I_{2(gain)} = \frac{1}{I_{2(max.)} - I_{2(min.)}}$$

where:
$I_{2(max.)}$ = the maximum value of I(x) in the second data region
$I_{2(min.)}$ = the minimum value of I(x) in the second data region
$I_{2(gain)}$ = the intensity gain value assigned to the center of the second data region The above equation for $I_{2(gain)}$ indicates that if the differences between the input signal I(x) in the second data region and the bias values F'(x) in the second data region are respectively multiplied by the associated gain values G'(x) in the second data region, the maximum signal value in the second data region will be expanded all the way up to the intensity saturation level ($I_{sat}$). That $I_{2(gain)}$ value will then be assigned to the center of the second data region.

For data region 1, a similar operation will be performed to obtain:

$$I_{1(gain)} = \frac{1}{I_{1(max.)} - I_{2(min.)}}$$

where:
$I_{1(max.)}$ = the maximum value of I(x) in the first data region
$I_{1(min.)}$ = the minimum value of I(x) in the first data region
$I_{1(gain)}$ = the intensity gain value assigned to the center of the first data region A smooth gain function G'(x) from the center of data region 1 to the center of data region 2 is given by the expression:

$$G(x)_{1-2} = \frac{I_{2(gain)} - I_{1(gain)}}{32} (x - 16) + I_{1(gain)}$$

From the above operations that have been performed a resulting floor function and a resulting ceiling function can be defined. The resulting floor function is:
floor function = input signal minimum − the bias (or pixel bias correction signals)
ceiling function + [input signal maximum − the bias] gain The final step is generating the enhanced intensity function shown in FIG. 11 by multiplying point by point the function of FIG. 9 by the gain function G'(x) of FIG. 10. Note that FIG. 11 has maximized the dynamic range of contrast of the original signal I(x) of FIG. 2 without any discontinuities.

Figure 10:
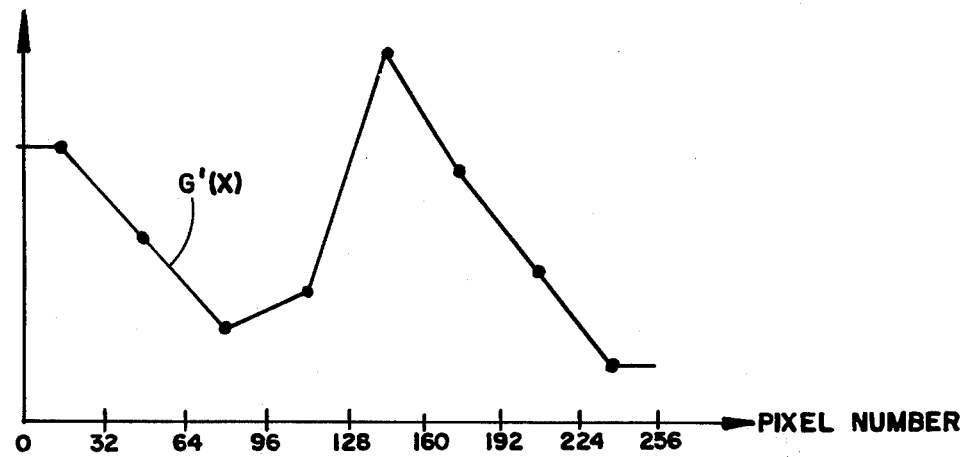
Figure 11:
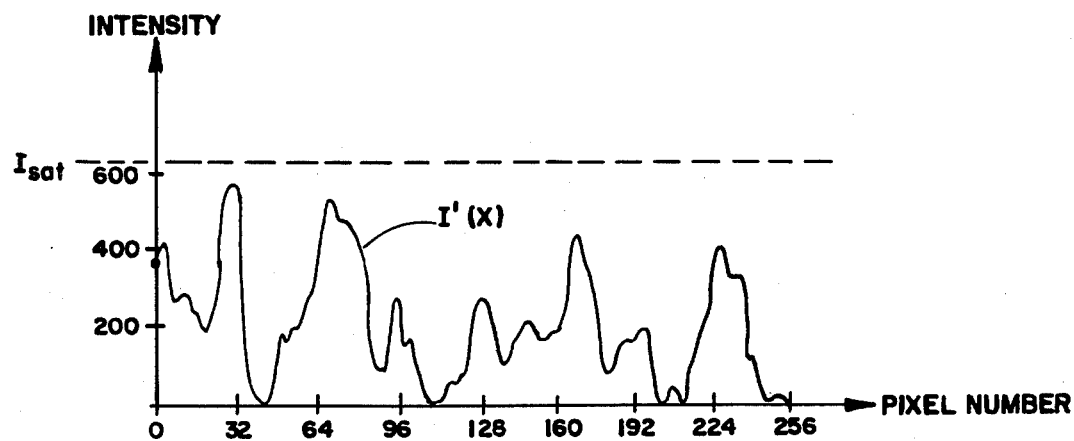

If no smoothing operations, as shown in FIGS. 8 and 10, had been done from one data region into another, neither the floor function nor the ceiling function would ever run into saturation. This means that the ceiling function would not exceed the maximum allowable value ($I_{sat}$) of the signal, and the floor function would not exceed the minimum allowable value (zero) of the signal. However, because of the smoothing operations performed, some temporary saturation (positive and/or negative) may be encountered. There are two ways that the I-getter 13 of FIG. 1 can be operated in regard to temporary saturation. One way is for the I-getter 13 to not develop the real maximum and minimum values of I(x) in each data region, but rather to use some function of those maximum and minimum values that can be obtained from an amplitude distribution function of the incoming pixel data. The other way is for the I-getter 13 to develop actual minimum and maximum values of I(x), particularly when it is determined that temporary local saturation is probably something that can be tolerated.

Figure 12:
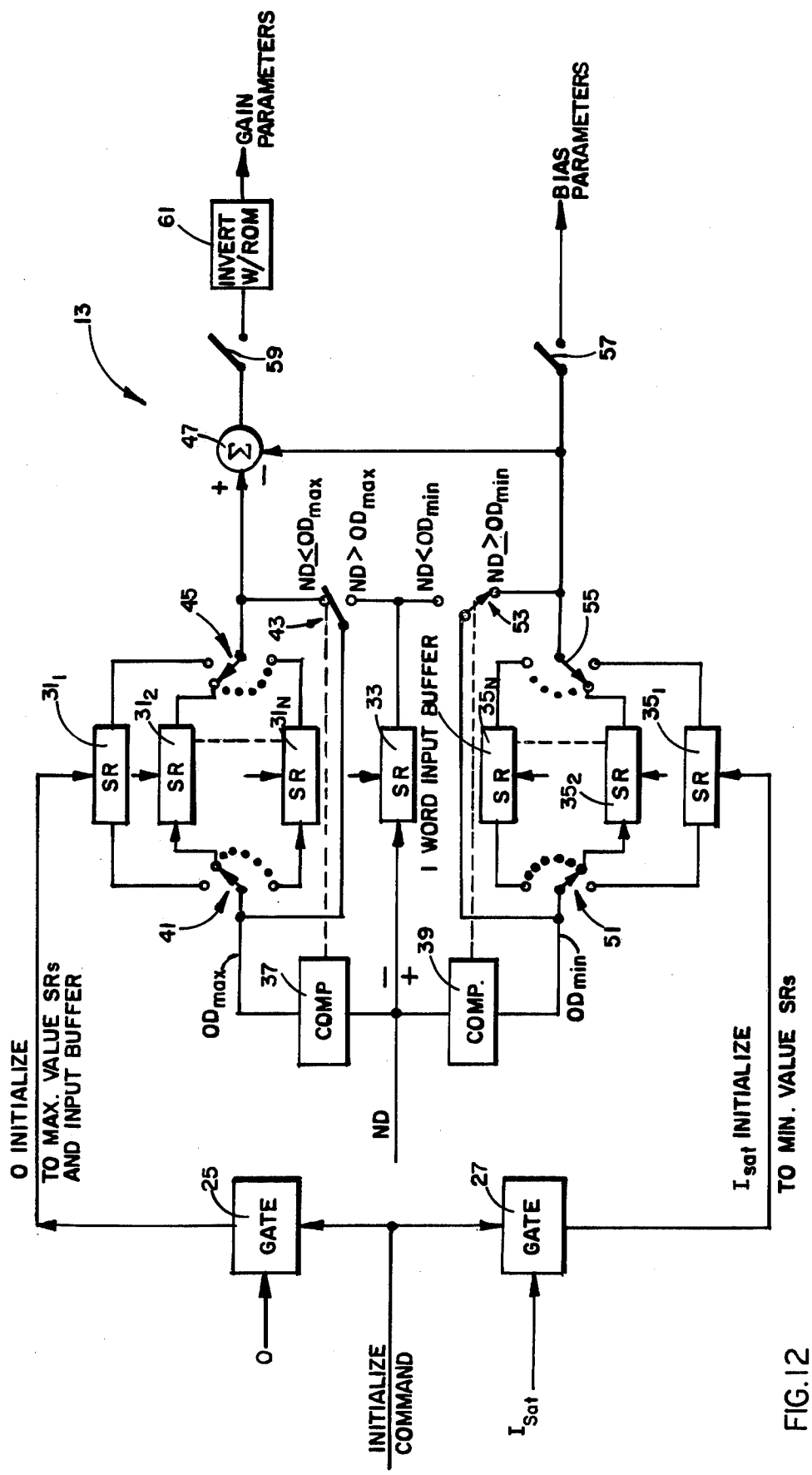
FIG. 12 is a block diagram of one type of I-getter which may be used in the system of FIG. 1.

When temporary saturation of the electronics of the system of FIG. 1 can be tolerated or when simple maximum and minimum criteria are adequate for a desired application, the I-getter of FIG. 12 is suitable for developing the minimum or bias parameters and the gain parameters which the function generators 15 and 17 respectively need. The I-getter 13 of FIG. 12 works only on the extrema values of the signal in each given data region.

In FIG. 12, at the time of the initialize command, gates 25 and 27 are respectively enabled. When enabled, the gate 25 passes a digital 0 signal, which is stored in each of maximum value shift registers $29_1$, $29_2$ . . . $29_N$ and in a one word input buffer shift register 31 as an initial maximum value. Similarly, when enabled, the gate 27 passes a digital number equal to $I_{sat}$, which is stored in each of minimum value shift registers $33_1$, $33_2$ . . . $33_N$ as an initial minimum value.

It should be noted that there is one shift register in the group $29_1$ . . . $29_N$ for each data cell used in an output picture, and that there is also one shift register in the group $33_1$ . . . $33_N$ for each data cell.

Input new data (ND), or I(x), is applied to the input buffer 31 and to comparators 35 and 37. The comparator 35 compares the new data ND with the maximum old data ($OD_{max.}$) contained in the data cell being examined at that time. If ND is larger than $OD_{max}$(N-D>$OD_{max}$) the comparator 35 will cause switch 43 to move to its lower position so that the new piece of data ND will go two places. In this case, the ND will be picked up from the output of register 33, read into the maximum register from which the previous maximum value was read, and it will also be fed back to the comparator 37 to await a comparison with the next piece of new data. Once again if the next input word or new piece of data ND is larger than the previous value that was stored, the above cycle will repeat. If, on the other hand, the next input word is not larger than $OD_{max}$, the comparator 37 will cause the switch 43 to remain in its upper position and the $OD_{max}$ that was in the shift register being read out will circulate back around and be restored in that same shift register.

The operation of the minimum value registers $35_1 \ldots 35_N$ will now be explained. If a piece of new data or ND is very small it is compared in the comparator 39 with the previously stored minimum value of data for the data cell being examined at that time. If ND is smaller than the previously stored data, the comparator 39 will cause the switch 53 to fly to its lower position to pick up the new data from the input buffer 33, read that ND back into the appropriate minimum value shift register from which the previous minimum value was read, and also feed that ND back to the comparator for comparison with the next piece of new data that comes in.

So each time a piece of new data comes in, it is simultaneously compared with both the previously stored maximum and minimum values for that data cell. If the new data is the largest or the smallest that has been seen for that data cell, it will be identified and stored accordingly in the appropriate shift register.

After the data cell that provides the data for $I_4$ of a given macro cell (to be explained) has been completed, examined for maximum and minimum values, the cycle for that macro cell ends, and the information from the associated maximum and minimum value registers that provide that $I_4$ information are read out.

The minimum value for a data region is read directly out of the associated minimum value register and through new closed switch 57. That minimum value is also subtracted in a combiner or subtractor 47 from the maximum value stored for that data cell in the associated maximum value register. The resultant signal of the combiner 47 is fed through a now closed switch 59 to an inverting ROM 61 to invert that signal. The output of the ROM 61 is the gain parameter associated with $I_4$.

The switches 41, 45, 51 and 51 are ganged and are connected to the input and output of each of the maximum and minimum value registers associated with the particular data cell being examined at any given time.

The sequence of outputs of the ROM 61 are the gain parameters which are applied to the gain function generator 17 of FIG. 1. The sequence of outputs from the switch 57 are the bias parameters which are applied to the bias function generator 15 of FIG. 1.

The implementation of a circuit based upon an amplitude distribution function can be based upon using, for example, 80% and 20% amplitude distribution values instead of maximum and minimum values, for effective maximum and minimum values to prevent positive and negative saturation. Such amplitude distribution function generators are well known in the art. As a result no further description of other I getters will be made.

For ease of explanation, a 16×16 matrix or array of pixels (picture points) will be subsequently discussed in relation to FIGS. 13-20, rather than the 256×256 matrix of pixels indicated in FIGS. 2-11. However, it should be understood that a 256×256 matrix, or any other suitably sized matrix, can be appropriately utilized by the invention disclosed herein.

As described before, the bias parameters and the gain parameters from the I getter 13 are respectively applied to the bias function generator 15 and the gain function generator 17. The bias parameters, like the gain parameters, comprise a matrix of widely-spaced pixels. The problem to be resolved by each of the function generators 15 and 17 is to smooth in the associated, widely-spaced matrix of (bias or gain) parameters so that there is a continuous gradient across the associated pixel (bias or gain) correction signals. Thus, the function of the bias function generator 15 is to convert the matrix of bias parameters into a smoothed floor function of pixel bias correction signals. These pixel bias correction signals are comprised of a matrix of pixels that is larger in size than the matrix of bias parameters. In a like manner, the function of the gain function generator 17 is to convert the matrix of gain parameters into a smoothed gain function of pixel gain correction signals. These pixel gain correction signals, like the pixel bias correction signals, are comprised of a matrix of pixels that is larger in size than the matrix of gain parameters.

For illustrative purposes, let the bias parameters, as well as the gain parameters, be represented by a 4×4 matrix or array of pixels (P's), designated as $P_{0,0} \ldots P_{3,3}$.

The structure, function and operation of the gain function generator 17 are similar to those of the bias function generator 15. Therefore, only the bias function generator will be further explained.

Figure 13:
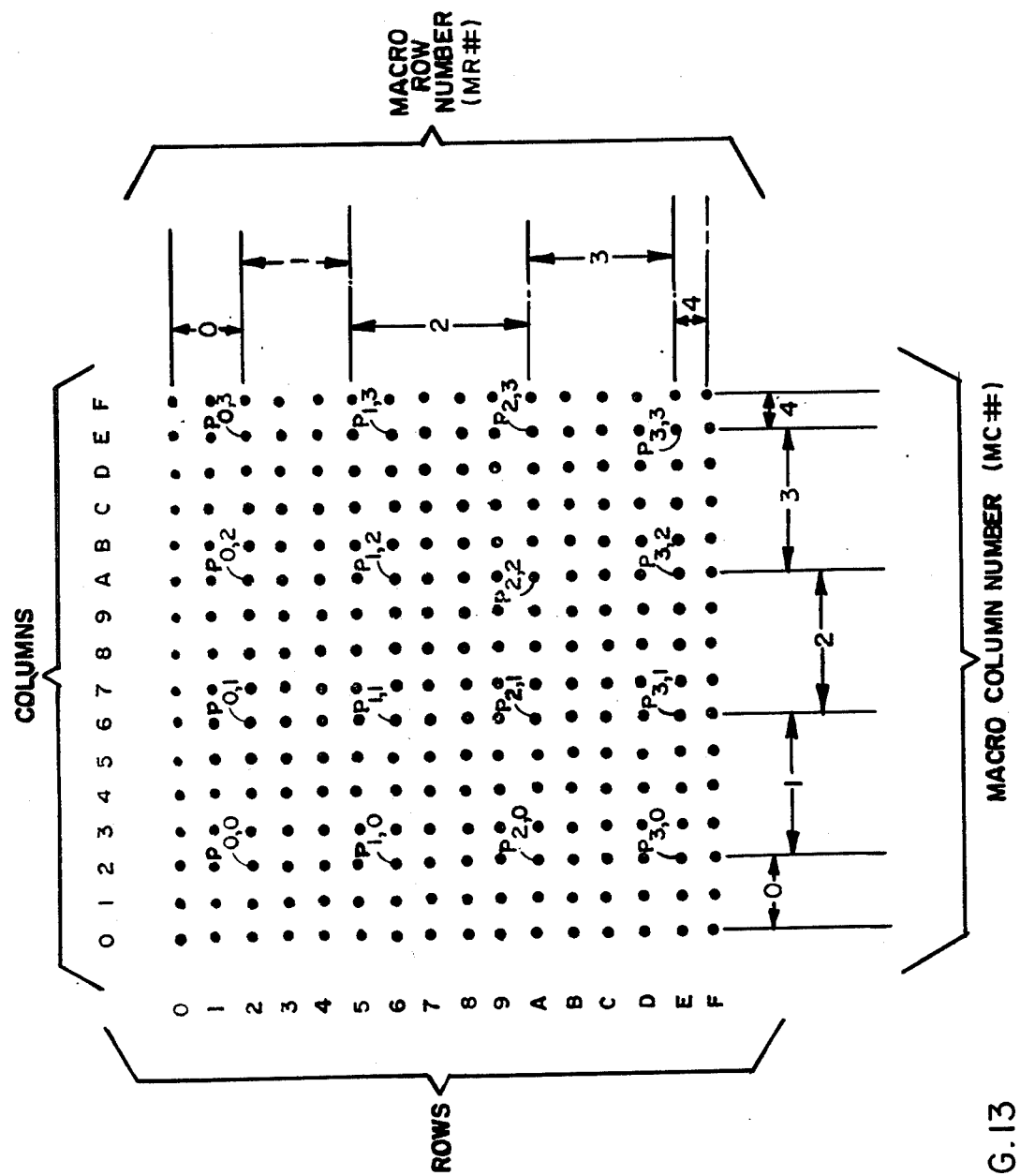
FIG. 13 illustrates an exemplary format of a 16×16 matrix or array of pixel (picture) points that is to be reconstituted from an exemplary 4×4 matrix or array of pixels (P's) that is received by one of the function generators from the I-getter of FIG. 1.

FIG. 13 illustrates an exemplary format of a 16×16 matrix or array of pixel (picture) points that is to be reconstituted by the bias function generator 15 from the exemplary 4×4 matrix or array of pixels (P's), designated as $P_{0,0} \ldots P_{3,3}$, that is received from the I-getter 13. In comparison with the 525 lines of picture information in an ordinary broadcase television picture, this exemplary matrix of FIG. 1 is coarse, having only 16 lines of pixel information and 16 pixels in each line. However, this simplified 16×16 array is sufficient to explain the operation of each of the function generators 15 and 17. It should be clear to those skilled in the art that the principles of the invention are equally applicable to matrices having other formats.

Essentially, the picture of FIG. 13 can be likened to a coarse block image, defined by the bias parameters or pixels $P_{0,0} \ldots P_{3,3}$ at the intersections of a two-dimensional square mesh. Each hole in the mesh is to be filled in or shaded in with computed intensity points obtained from the pixels existing at the four corners of the hole.

The 4×4 pixel array ($P_{0,0} \ldots P_{3,3}$) in the matrix of bias parameters is to be shaded in by reconstituting or reconstructing it back into the 16×16 pixel-format (of 16 lines or rows of picture information and 16 pixels per line) that was developed by the signal source 11. This reconstituted 16×16 pixel array will be developed along the 16 horizontal lines or rows and 16 vertical columns or columns that are illustrated in FIG. 13. However, it should be noted that each of the 16 lines to be shaded in is not really an analog or continuous line, but rather a sequence of 16 points of computed intensities.

For the sake of convenience, hexadecimal notation is used to identify the locations of the reconstituted 16×16 array of pixel points. Thus, a sequence of sixteen numbers can be represented by the following sixteen characters: 0, 1, 2, 3, 4, 5, 6, 7, 8, 9, A, B, C, D, E and F. As shown in FIG. 13, each picture point location is described by a hexadecimal number, with the first character corresponding to an associated one of the 16 rows (0, 1 ... 9, A, B ... F) and the second character corresponding to an associated one of the 16 columns (0, 1 ... 9, A, B ... F).

As further shown in the exemplary picture format of FIG. 13 the 4×4 array of bias parameters or pixels $P_{0,0} \ldots P_{3,3}$ is used to form 5 horizontal MR's or macro (large) rows (0, 1 ... 4) and 5 vertical MC's or macro (large) columns (0, 1 ... 4). Macro rows (MR's) 0, 1 .. . 4 respectively include horizontal lines or rows 0-2, 2-6, 6-A, A-E and E-F; and macro columns (MC's) 0, 1 . . . 4 respectively include vertical columns 0-2, 2-6, 6-A, A-E and E-F. It can be seen that there is a shared boundary between adjacent macro rows and a shared boundary between adjacent macro columns.

Figure 14:
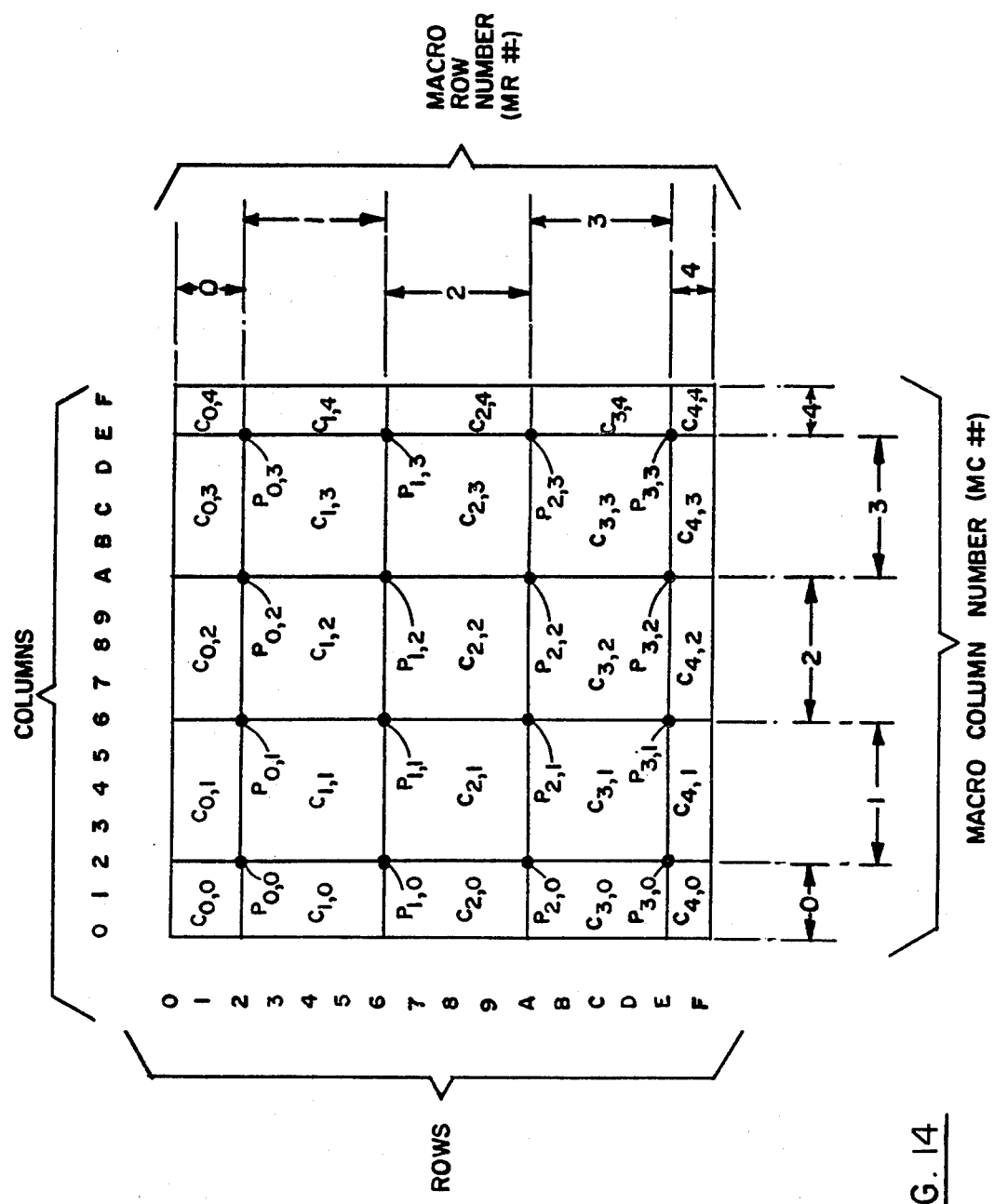
FIG. 14 illustrates how the received exemplary 4×4 array of pixels (P's) forms macro rows and macro columns, and how the intersections of macro rows and macro columns form macro cells and fractional cells.

Referring now to FIG. 14, FIG. 14 illustrates how the exemplary 4×4 array of bias parameters or pixels $(P_{0,0} \ldots P_{3,3})$ forms these macro rows and macro columns, and how the intersections of these macro rows and macro columns form macro cells and fractional cells (C). For example, the interception of one of the macro rows 1, 2 and 3 with one of the macro columns 1, 2 and 3 identified what will be called a macro (large) cell. A macro cell is an area of the picture of FIG. 14 which is bounded in its four corners by four of the bias parameters or pixels. For example, pixels $P_{0,0}$, $P_{0,1}$, $P_{1,0}$ and $P_{1,1}$ define the boundaries of macro cell $C_{1,1}$. The interception of one of the macro rows 0 and 4 with one of the macro columns 0, 1 ... 4 produces what will be called a fractional cell. Likewise, the interception of one of the macro columns 0 and 4 with one of the macro rows 0, 1 ... 4 produces a fractional cell. A fractional cell lies in a border area of the picture of FIG. 14 and is bounded in its four corners by only one or two of the received pixels. For example, corner fractional cell $C_{0,0}$ is bounded by only one of the received pixels $(P_{0,0})$, whereas top fractional cell $C_{0,2}$ is bounded by two of the received pixels ($P_{0,1}$ and $P_{0,2}$).

Figure 15:
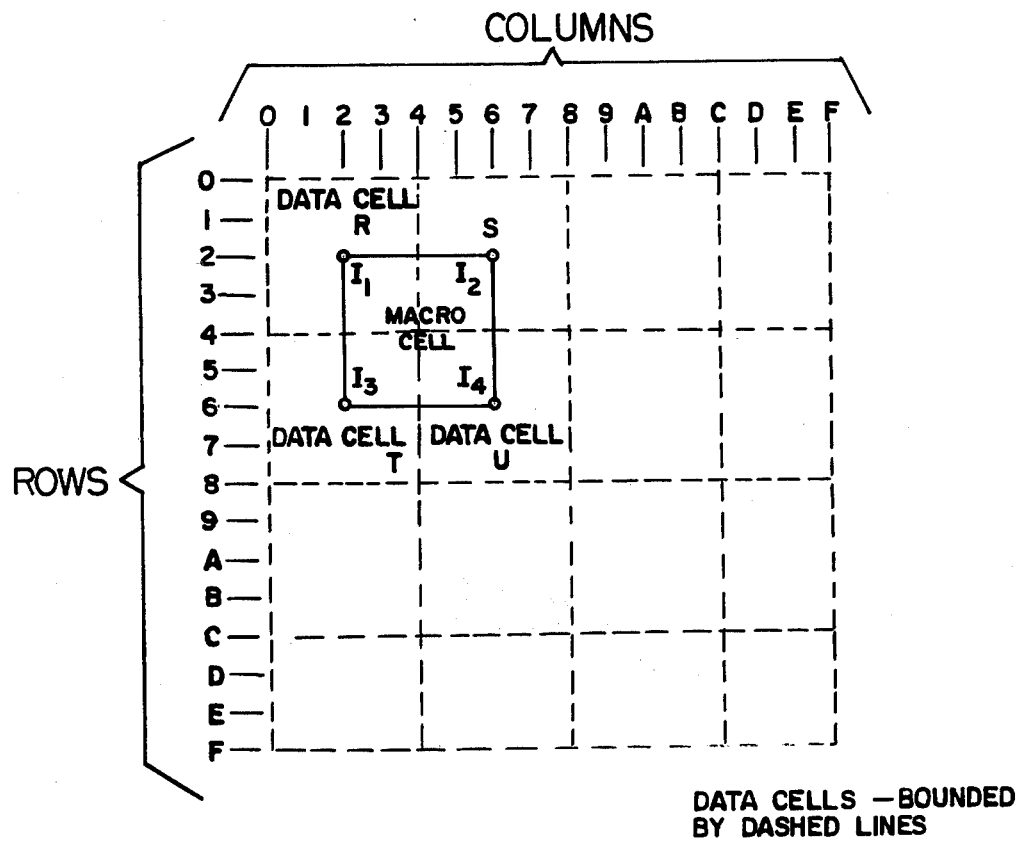
FIG. 15 illustrates how the vertices of a macro cell are derived from four contiguous data cells.

It should be noted at this time that the macro cell over which the function generator 15 operates has, at its vertices, points or pixels which (other than in the border areas) lie in the centers of other squares. For example, FIG. 15 illustrates the points or pixels $I_1$, $I_2$, $I_3$ and $I_4$ which respectively lie in the centers of squares or data cells R, S, T and U. In its operation, the I-getter 13 searches, for example, data cells R, S, T and U for data which respectively yield intensity values $I_1$, $I_2$, $I_3$ and $I_4$ that lie at the vertices of the indicated macro cell. The boundaries of other data cells are also illustrated in FIG. 15 with reference to the rows and columns illustrated in FIGS. 13 and 14.

Referring back to FIG. 14, the location of a macro or fractional cell (C) is defined by a pair of subscripted numbers. The first subscripted number designates the macro row the cell is found in, whereas the second subscripted number designates the macro column the cell is found in. For example, fractional cell $C_{0,0}$ is located in macro row 0 and macro column 0; macro cell $C_{1,3}$ is located in macro row 1 and macro column 3; and fractional cell $C_{4,3}$ is located in macro row 4 and macro column 3. Thus, the exemplary picture format to be shaded in, as shown in FIG. 14, contains a 5×5 array of 25 macro and fractional cells $C_{00} \ldots C_{44}$. Note that the top and bottom macro rows 0 and 4 respectively contain fractional cells $C_{00} \ldots C_{04}$ and $C_{40} \ldots C_{44}$; and that left and right macro columns 0 and 4 respectively contain fractional cells $C_{00} \ldots C_{40}$ and $C_{04} \ldots C_{44}$.

In its operation (to be discussed) the function generator 15 selectively utilizes the four received corner pixels of each macro cell of FIG. 14 to compute and smoothly fill in the picture points, shown in FIG. 13, that lie within the boundaries of that macro cell. The function generator 15 computes these picture points for a macro cell by a double linear interpolation. Whenever fractional cells are involved (in border areas), as shown in FIGS. 13 and 14, the function generator 15 selectively fills in each fractional cell with either zero or one-dimensional linear interpolations.

Since the number of macro cells ($3^2$), macro cell size (4×4 points), and exemplary picture format (16 by 16 points) are known in advance, the borders (top, bottom, left-hand and right-hand) can be preselectively balanced around the reconstructed array. For purposes of this discussion let: macro row 0 (top border) contain lines 0-2 (with line 2 being shared between macro row 0 and macro row 1); macro row 4 (bottom border) contain lines E and F (with line E being shared between macro row 3 and macro row 4); macro column 0 (left-hand border) contain columns 0-2 (with column 2 being shared between macro column 0 and macro column 1); and macro column 4 (right-hand border) contain columns E and F (with column E being shared between macro column 3 and macro column 4). The remaining macro rows and macro columns respectively contain the lines and columns indicated in FIG. 13.

To see how a macro cell is shaded in, reference will now be made to FIG. 16. FIG. 16 illustrates a typical macro cell 12 which is bounded at its four corners by received pixels. Let $I_1$, $I_2$, $I_3$ and $I_4$ represent the pixels or intensity points located at these four corners. These intensity (I) values represent the boundaries of the intensities that are to be shaded across the cell 12 and from the top to the bottom of the cell 12. The origin, for purposes of this discussion, is the upper left (UL)-hand corner pixel $I_1$. Positive horizontal motion in the x-direction is left-to-right from, for example, $I_1$ to $I_2$ in the upper right (UR)-hand corner. Positive vertical motion in the y-direction is defined as downward along the left-hand boundary from the origin $I_1$ to $I_3$ in the lower left (LL)-hand corner. Pixel $I_4$ is located in the lower right (LR)-hand corner to complete the cell 12.

By selectively utilizing the pixels $I_1$, $I_2$, $I_3$ and $I_4$, a sequence of intensities can be interpolated across any of the top, bottom, left-hand or right-hand sides of the cell 13. Consider, for example, the linear gradients on the left-hand and right-hand sides of the cell 12. In terms of y the intensity of any intermediate point can be interpolated along the left-hand side ($I_L$) of the cell 12 by the equation:

$$I_L = I_1 + \frac{I_3 - I_1}{4} y \qquad (1)$$

and along the right-hand side of the cell 12 by the equation:

$$I_R = I_2 + \frac{I_4 - I_2}{4} y \qquad (2)$$

where:
  y = the vertical displacement in the discrete increments of 0, 1, 2, 3, 4,
  $I_L$ = the intensity values along the left-hand boundary of the cell 12,
  $I_R$ = the intensity values along the right-hand boundary of the cell 12,
  $I_1$ = the initial intensity at the top of the left-hand boundary of the cell 12,
  $I_2$ = the initial intensity at the top of the right-hand boundary of the cell 12, $(I_3-I_1)/4$ = the vertical gradient along the left-hand boundary of the cell 12, and $(I_4-I_2)/4$ = the vertical gradient along the right-hand boundary of the cell 12.

The number 4 that is used in the denominator of each of equations (1) and (2) is strictly an indicator of the distance between $I_1$ and $I_3$ in equation (1) and between $I_2$ and $I_4$ in equation (2). It has been previously assumed, for purposes of this discussion, that the distance between $I_1$ and $I_3$ and between $I_2$ and $I_4$ is 4, although in practice it would be a much larger number (N). Thus, in this explanation the variable y takes on the values of 0, 1, 2, 3 and 4. As a result, the boundary conditions are 0 and 4 which correspond to the case of y being respectively at locations $I_1$ and $I_3$ in equation (1) or respectively at locations $I_2$ and $I_4$ in equation (2).

The cell 12 of FIG. 16 can be smoothly shaded in (painted in, filled in) by the use of two operations.

In the first operation, as indicated in equations (1) and (2) and shown in FIG. 16, the vertical lines $I_1I_3$ and $I_2I_4$ (or sequences of interpolated intensity points) are shaded in from top to bottom on the left-hand and right-hand sides of the cell 12. Thus, the equations (1) and (2) are used to respectively establish the intensities along the left-hand and right-hand sides or boundaries of the cell 12. Each of these equations is an intercept-slope formula. In equation (1), for example, $I_1$ is basically an intercept number and the slope is $(I_3-I_1)/4$ times y, the independent variable. Note that an intercept-slope formula is a linear fit along any boundary: $I_1$ to $I_3$, $I_2$ to $I_4$ or any place else along a boundary.

Each of the lines $I_1I_3$ and $I_2I_4$ contains 5 intensity points with two of the intensity points being received pixels and the remaining 3 exemplary points being computed intensity points. In shading in these lines ($I_1I_3$ and $I_2I_4$), an intensity is computed by interpolation for each of the 3 intermediate intensity points ($a_1$, $a_2$ and $a_3$) between the received intensity points $I_1$ and $I_3$ in the vertical line $I_1I_3$, and for each of the 3 points ($b_1$, $b_2$ and $b_3$) between the received intensity points $I_2$ and $I_4$ in the vertical line $I_2I_4$. Each of these vertical lines varies gradually in intensity whenever the associated received intensity points (e.g. $I_1$ and $I_3$) in a line (e.g. $I_1I_3$) have different intensities. For example, as illustrated in FIG. 17, the vertical line $I_1I_3$ (on the left hand side of the macro cell of FIG. 16) contains the received intensity points $I_1$ and $I_3$ and the 3 intermediate computed intensity points $a_1$, $a_2$ and $a_3$, all of which vary gradually in intensity from $I_1$ to $I_3$.

In the second operation, the space between the computed vertical lines $I_1I_3$ and $I_2I_4$ of FIG. 16 can be substantially shaded in by computing the horizontal graduations of intensities between corresponding adjacent and computed points along the lines $I_1I_3$ and $I_2I_4$. The points $I_1$, $a_1$, $a_2$, $a_3$ and $I_3$ in line $I_1I_3$ respectively correspond in vertical position to the points $I_2$, $b_1$, $b_2$, $b_3$ and $I_4$ in line $I_2I_4$. Since there are 5 points along each of the vertical lines $I_1I_3$ and $I_2I_4$, there will be 5 horizontal lines shaded in between corresponding points in the lines $I_1I_3$ and $I_2I_4$. In other words, a sequence intensity can be interpolated across each of these horizontal lines. Like the vertical lines $I_1I_3$ and $I_2I_4$, each of the 5 horizontal lines is comprised of 5 intensity points, with two of the intensity points being corresponding points in the lines $I_1I_3$ and $I_2I_4$ and the remaining 3 points being computed intensity points between those corresponding points. In shading in each of these 5 horizontal lines ($I_1I_2$, $a_1b_1$, $a_2b_2$, $a_3b_3$ and $I_3I_4$), an intensity is computed by interpolation for each of the 3 intermediate intensity points in a horizontal line. Like the vertical line $I_1I_3$ of intensity points illustrated in FIG. 17, each of the horizontal lines varies gradually in intensity whenever the corresponding end points (e.g., $a_2$ and $b_2$ in FIG. 18) in the lines $I_1I_3$ and $I_2I_4$ have different intensities.

More specifically, this second operation is accomplished by applying the same intercept-slope formula that was used in equations (1) and (2) and also by ascribing the same value of y to both of equations (1) and (2) in order to do a linear fit between given points $I_L$ and $I_R$ of equations (1) and (2). In this manner, the intensity of an intermediate point $I_M$ can be computed between the given points $I_L$ and $I_R$ by the following equation:

$$I_M = I_L + \frac{I_R - I_L}{4} x \qquad (3)$$

where the variable x will take on the values of 0, 1, 2, 3 and 4.

Substituting the values of $I_L$ and $I_R$ from equations (1) and (2) into equation (3) and simplifying:

$$I_M = I_1 + \left(\frac{I_3 - I_1}{4}\right)y + \left(\frac{I_2 - I_1}{4}\right)x + \left(\frac{I_1 - I_2 - I_3 + I_4}{4^2}\right)xy \qquad (4)$$

where:

$I_M$ = the intensity of an intermediate point at horizontal position x and vertical position y, x = the discrete increments (0, 1, 2, 3, 4) of horizontal displacement (or position) from the left-side of the cell, y = the discrete increments (0, 1, 2, 3, 4) of vertical displacement (or position) from the top side of the cell, $I_1$ = the initial intensity at the top of the left-hand boundary of the cell 12, where y=0 and x=0, $(I_3-I_1)/4$ = the vertical gradient along the left-hand boundary of the cell, $(I_2-I_1)/4$ = the horizontal gradient across the upper boundary of the cell, and $(I_1-I_2-I_3+I_4)/4^2$ = the total gradient from the upper left corner to the lower right corner of the cell (or the gradient in terms of both x and y).

By the use of equation (4) the entire macro cell 12 of FIG. 16 can be smoothly shaded in from the original four intensity points $I_1$, $I_2$, $I_3$ and $I_4$ for that macro cell.

An examination of equation (4) discloses that the intermediate intensity $I_M$ is composed of four terms: $I_1$ (the initial intensity of cell 12), plus a vertical weighting value comprised of a vertical gradient $(I_3-I_1)/4$ times y, plus a horizontal gradient $(I_2-I_1)/4$ times x, plus a total gradient (or horizontal gradient update quantity) $(I_1-I_2-I_3+I_4)/4^2$ times the product xy (or gradient with respect to both x and y).

If the partial derivative of the intermediate intensity $I_M$ of equation (4) is taken with respect to x the following equation (5) is obtained for deriving horizontal gradient information.

$$\frac{\partial I_M}{\partial x} = \frac{I_2 - I_1}{4} + \frac{I_1 - I_2 - I_3 + I_4}{4^2} y \qquad (5)$$

Equation (5) shows the horizontal gradient $(I_2-I_1)/4$ plus the horizontal gradient update quantity $(I_1-I_2-I_3$ $+I_4)/4^2$, which is a function of the four corner intensities, times y. Thus, equation (5) supplies the horizontal gradient information for any given line of computed intensity points across a macro cell.

To establish the proper vertical weighting value of intensity in terms of y for the start of a horizontal sweep across a given horizontal line of a macro cell, the vertical gradient of the intensity along the left-hand side (e.g. line $I_1I_3$ in FIG. 16) of the macro cell (11) must be known. This vertical gradient can be obtained by taking the partial derivative of the intermediate intensity $I_M$ with respect to y, resulting in the following equation:

$$\left.\frac{\partial I_M}{\partial y}\right|_{x=0} = \frac{I_3 - I_1}{4} \qquad (6)$$

By taking the second derivative of equation (5) with respect to y, the horizontal gradient update quantity is derived, as shown in equation (7) below, for correcting the y-dependent part of the intensity in equation (5).

$$\frac{\partial^2 I_M}{\partial x \partial y} = \frac{I_1 - I_2 - I_3 + I_4}{4^2} \qquad (7)$$

It should be noted at this time that the received intensity points (e.g., $I_1$, $I_2$, $I_3$, $I_4$) at the corners of a macro cell are also used in conjunction with the shading in of adjacent macro and fractional cells. FIG. 18 specifically illustrates how the received intensity points ($I_1$, $I_2$, $I_3$, $I_4$) of an exemplary macro cell ($C_{j,k}$) are also used in conjunction with the shading in of adjacent cells. As shown in FIG. 18:

$I_1$ of cell $C_{j,k}$ = $I_4$ of cell $C_{j-1,k-1}$
= $I_3$ of cell $C_{j-1,k}$
= $I_2$ of cell $C_{j,k-1}$
$I_2$ of cell $C_{j,k}$ = $I_4$ of cell $C_{j-1,k}$
= $I_3$ of cell $C_{j-1,k+1}$
= $I_1$ of cell $C_{j,k+1}$
$I_3$ of cell $C_{j,k}$ = $I_4$ of cell $C_{j,k-1}$
= $I_2$ of cell $C_{j+1,k-1}$
= $I_1$ of cell $C_{j+1,k}$
$I_4$ of cell $C_{j,k}$ = $I_3$ of cell $C_{j,k+1}$
= $I_2$ of cell $C_{j+1,k}$
= $I_1$ of cell $C_{j+1,k+1}$ This re-use of the received pixels or intensity points ($I_1$, $I_2$, $I_3$, $I_4$) of a macro cell in adjacent macro and fractional macro cells makes equation (4) equally applicable to the shading in of each of the cells $C_{0,0}$ ... $C_{4,4}$ shown in FIG. 14. Furthermore, an examination of Equation (4) and of FIG. 18 reveals that each of the macro cells in FIG. 14 has both vertical and horizontal gradients, since each macro cell contains four received pixels or intensity points at the four corners of that macro cell. Thus, each macro cell is shaded in by double linear interpolation, as shown in Equation (4), from the received pixels existing at the four corners of that macro cell.

However, unlike the macro cells, the border cells, which are fractional cells, are not shaded in with double linear interpolation. Each of the border cells has either only one or neither of horizontal and vertical gradients. Referring back to FIG. 16, it can be seen that the border areas are comprised of UL, UR, LL and LR corner cells ($C_{0,0}$, $C_{0,4}$, $C_{4,0}$ and $C_{4,4}$) each containing only one pixel, and top, left, right and bottom border cells ($C_{0,1}$ ... $C_{0,3}$, $C_{1,0}$ ... $C_{3,0}$, $C_{1,4}$ ... $C_{3,4}$ and $C_{4,1}$ ... $C_{4,3}$) each containing only two pixels. Each of the corner cells is shaded in with an intensity equal to the intensity of the associated pixel (e.g., point $P_{0,0}$ of corner cell $C_{0,0}$). Thus, the corner cells are each substantially solid in intensity with no gradients. On the other hand, each of the remaining border cells has a gradient between the two intensity points associated with that border cell (e.g. points $P_{0,0}$ and $P_{0,1}$ of top border cell $C_{0,1}$), but has no gradient between a point (e.g. $P_{0,1}$) and the extreme edge (e.g. top border) of the picture.

FIG. 19 illustrates the graduation fluctuations in the intensities of the picture points or pixels that lie along, for example, row or line 6 of FIG. 13 (or FIG. 14). The intensity of each intensity point along line or row 6 is given by $I_M$ of equation (4) and is computed across the entire 16×16 matrix given by $I_M$ of equation (4) and is computed across the entire 16×16 matrix in response to the received intensity points $P_{1,0}$ ... $P_{1,3}$. Note that there is a fixed slope for the associated line segment of row 6 that passes through each of the cells $C_{1,0}$ ... $C_{1,4}$ (or cells $C_{2,0}$ ... $C_{2,4}$, since the received intensity points $P_{1,0}$ ... $P_{1,3}$ are shared between adjacent cells).

Thus, in smoothing in the floor function (or generating pixel bias correction signals) for any macro or fractional cell area of the picture that is being shaded in, the proper intensity of the horizontal beam for any intensity point $I_M$ location in a cell can be generated by starting with the initial intensity for that cell, weighting that initial intensity of the cell by the product of the vertical gradient and the vertical displacement in y, and incrementing that weighted initial value according to the product of the updated horizontal gradient and the horizontal displacement in x. Wherever no gradient is present (gradient=0), the associated term of equation (4) drops out.

The function generator 15 (or 17) is implemented directly from the above equations. A block diagram of a function generator 15 (or 17) is illustrated in FIG. 20 which will now be discussed.

Figure 20:
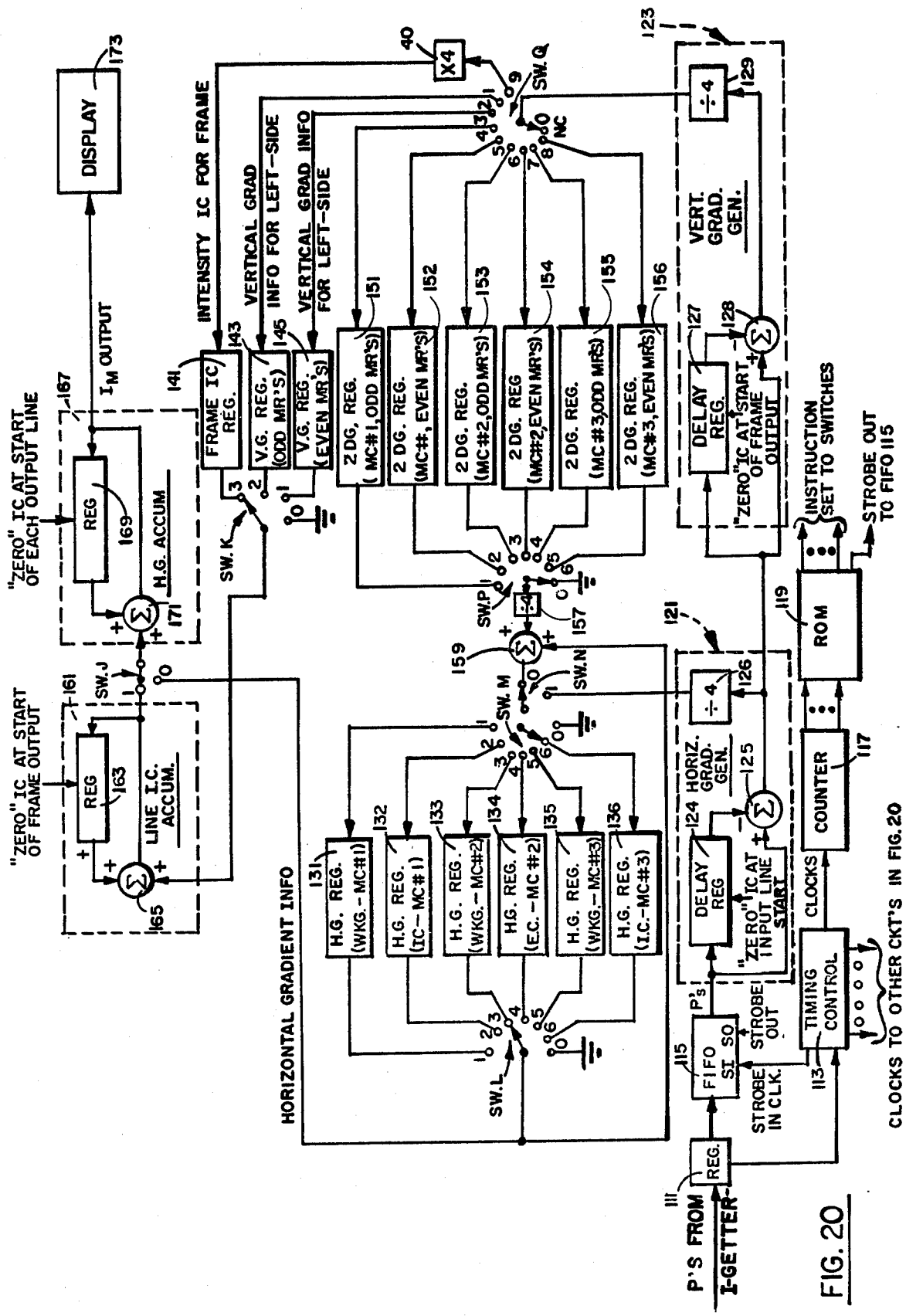
FIG. 20 illustrates a block diagram of either of the function generators illustrated in FIG. 1.

The bias function generator 15 (or gain function generator 17) illustrated in FIG. 20 computes the intensities of pixel bias correction signals (I's) in order to reconstitute an exemplary 16×16 array of picture points ($I_{0,0}$ ... $I_{FF}$) from the exemplary 4 by 4 array of bias parameters or pixels ($P_{0,0}$ ... $P_{3,3}$) being received from the I-getter 13. It should be understood, however, that any other suitable reconstructed or reconstituted picture point array, as well as other suitable input pixel array, could be used. Also, for purposes of this discussion, let the amplitude of each of the received pixels $P_{0,0}$ ... $P_{3,3}$ be represented by an 8-bit wide binary number.

A timing control circuit 113 uses synchronizing pulses contained in the bias parameters (P's) to synchronize the function generator of FIG. 20. The timing control circuit 113 can be a computer, a tape, circuitry and/or some other suitable device that produces clocks to strobe the 16 received pixels ($P_{0,0}$ ... $P_{3,3}$) into a first-in, first-out (FIFO) register circuit 115. At a preselected later time the control circuit 113 supplies to a counter 117 a sequence of 256 clocks—one clock for each pixel to be computed in the 16×16 pixel array of FIG. 15. The output counts of the counter 117 are used as addresses to enable a read only memory (ROM) 119 to generate an instruction set to control the positions of various switches (J, K, L, M, N, P and Q) in the system. In addition, the ROM 119 selectively applies at preselected times a sequence of 16 "strobe out" clocks to strobe the 16 received pixels out of the FIFO circuit 115. The instruction set utilized by the switches J, K, L, M, N, P and Q to enable the function generator of FIG. 20 to selectively use the received pixels (P's) being strobed out of the FIFO 115 in the computation of the output pixels or intensity points (I's) are shown in the following TABLE 1 (to be discussed). Notice that the 256 different subscripts on the I's given in TABLE 1 respectively correspond to the 256 output values (0 through 255) of the counter 117 in FIG. 20.

The function generator of FIG. 20 reconstitutes or shades in the picture illustrated in FIG. 13 by computing the intensity points (I's) in a raster scan fashion from the received pixels (P's). To aid in understanding how this computing operation is performed, FIG. 20 can be divided into the following functional units:

1. An input circuit comprised of a horizontal gradient generator 121 serially coupled to a vertical gradient generator 123.

The horizontal gradient generator 121 uses adjacent horizontal pairs of the received pixels to generate horizontal gradient information for the top part of the frame or picture of FIG. 13.

The vertical gradient generator 123 uses adjacent vertical pairs of the received pixels to generate vertical gradient information for the left-hand side of the frame or picture of FIG. 13.

2. Horizontal gradient (H.G.) registers 131–136 comprised of working (WKG) registers 131, 133 and 135 for macro columns (MC's) 1, 2 and 3, respectively, and of initial condition (IC) registers 132, 134 and 136 for macro columns (MC's) 1, 2 and 3, respectively.

The horizontal gradient IC registers 132, 134 and 136 selectively store the horizontal gradient information that is generated by the horizontal gradient generator 121 for the upper boundaries of macro columns 1, 2 and 3.

3. Multi-position switches (SW) J, K, L, M, N, P and Q, which have their respective switch positions controlled by the instruction set from the ROM 119. These switches may be electronic switches or suitable multiplexing devices.

TABLE I

| OUTPUT PIXEL ($I_M$) $I_{ROW,COL}$ | INPUT PIXEL | POSITIONS OF SWITCHES | | | | | | | OUTPUT PIXEL ($I_M$) $I_{ROW,COL}$ | INPUT PIXEL | POSITIONS OF SWITCHES | | | | | | |
|---|---|---|---|---|---|---|---|---|---|---|---|---|---|---|---|---|---|
| | | J | K | L | M | N | P | Q | | | J | K | L | M | N | P | Q |
| $I_{0,0}$ | $P_{1,0}$ | 1 | 3 | 0 | 0 | 0 | 0 | 1 | $I_{2,0}$ | | 1 | 0 | 0 | 0 | 0 | 0 | 0 |
| $I_{0,1}$ | | 0 | 0 | 0 | 0 | 0 | 0 | 0 | $I_{2,1}$ | | 0 | 0 | 0 | 0 | 0 | 0 | 0 |
| $I_{0,2}$ | | 0 | 0 | 0 | 0 | 0 | 0 | 0 | $I_{2,2}$ | | 0 | 0 | 0 | 0 | 0 | 0 | 0 |
| $I_{0,3}$ | | 0 | 0 | 2 | 1 | 0 | 0 | 0 | $I_{2,3}$ | | 0 | 0 | 1 | 0 | 0 | 0 | 0 |
| $I_{0,4}$ | $P_{1,1}$ | 0 | 0 | 1 | 0 | 0 | 0 | 3 | $I_{2,4}$ | | 0 | 0 | 1 | 0 | 0 | 0 | 0 |
| $I_{0,5}$ | | 0 | 0 | 1 | 0 | 0 | 0 | 0 | $I_{2,5}$ | | 0 | 0 | 1 | 0 | 0 | 0 | 0 |
| $I_{0,6}$ | | 0 | 0 | 1 | 1 | 0 | 0 | 0 | $I_{2,6}$ | | 0 | 0 | 1 | 1 | 0 | 1 | 0 |
| $I_{0,7}$ | | 0 | 0 | 4 | 3 | 0 | 0 | 0 | $I_{2,7}$ | | 0 | 0 | 3 | 0 | 0 | 0 | 0 |
| $I_{0,8}$ | $P_{1,2}$ | 0 | 0 | 3 | 0 | 0 | 0 | 5 | $I_{2,8}$ | | 0 | 0 | 3 | 0 | 0 | 0 | 0 |
| $I_{0,9}$ | | 0 | 0 | 3 | 0 | 0 | 0 | 0 | $I_{2,9}$ | | 0 | 0 | 3 | 0 | 0 | 0 | 0 |
| $I_{0,A}$ | | 0 | 0 | 3 | 3 | 0 | 0 | 0 | $I_{2,A}$ | | 0 | 0 | 3 | 3 | 0 | 3 | 0 |
| $I_{0,B}$ | | 0 | 0 | 6 | 5 | 0 | 0 | 0 | $I_{2,B}$ | | 0 | 0 | 5 | 6 | 0 | 0 | 0 |
| $I_{0,C}$ | $P_{1,3}$ | 0 | 0 | 5 | 0 | 0 | 0 | 7 | $I_{2,C}$ | | 0 | 0 | 5 | 0 | 0 | 0 | 0 |
| $I_{0,D}$ | | 0 | 0 | 5 | 0 | 0 | 0 | 0 | $I_{2,D}$ | | 0 | 0 | 5 | 0 | 0 | 0 | 0 |
| $I_{0,E}$ | | 0 | 0 | 5 | 5 | 0 | 0 | 0 | $I_{2,E}$ | | 0 | 0 | 5 | 5 | 0 | 5 | 0 |
| $I_{0,F}$ | | 0 | 0 | 0 | 0 | 0 | 0 | 0 | $I_{2,F}$ | | 0 | 0 | 0 | 0 | 0 | 0 | 0 |
| $I_{1,0}$ | | 1 | 0 | 0 | 0 | 0 | 0 | 0 | $I_{3,0}$ | | 1 | 2 | 0 | 0 | 0 | 0 | 0 |
| $I_{1,1}$ | | 0 | 0 | 0 | 0 | 0 | 0 | 0 | $I_{3,1}$ | | 0 | 0 | 0 | 0 | 0 | 0 | 0 |
| $I_{1,2}$ | | 0 | 0 | 0 | 0 | 0 | 0 | 0 | $I_{3,2}$ | | 0 | 0 | 0 | 0 | 0 | 0 | 0 |
| $I_{1,3}$ | | 0 | 0 | 1 | 0 | 0 | 0 | 0 | $I_{3,3}$ | | 0 | 0 | 0 | 0 | 0 | 0 | 0 |
| $I_{1,4}$ | | 0 | 0 | 1 | 0 | 0 | 0 | 0 | $I_{3,4}$ | | 0 | 0 | 1 | 0 | 0 | 0 | 0 |
| $I_{1,5}$ | | 0 | 0 | 1 | 0 | 0 | 0 | 0 | $I_{3,5}$ | | 0 | 0 | 1 | 0 | 0 | 0 | 0 |
| $I_{1,6}$ | | 0 | 0 | 1 | 1 | 0 | 0 | 0 | $I_{3,6}$ | | 0 | 0 | 1 | 1 | 0 | 1 | 0 |
| $I_{1,7}$ | | 0 | 0 | 3 | 0 | 0 | 0 | 0 | $I_{3,7}$ | | 0 | 0 | 3 | 0 | 0 | 0 | 0 |
| $I_{1,8}$ | | 0 | 0 | 3 | 0 | 0 | 0 | 0 | $I_{3,8}$ | | 0 | 0 | 3 | 0 | 0 | 0 | 0 |
| $I_{1,9}$ | | 0 | 0 | 3 | 0 | 0 | 0 | 0 | $I_{3,9}$ | | 0 | 0 | 3 | 0 | 0 | 0 | 0 |
| $I_{1,A}$ | | 0 | 0 | 3 | 3 | 0 | 0 | 0 | $I_{3,A}$ | | 0 | 0 | 3 | 3 | 0 | 3 | 0 |
| $I_{1,B}$ | | 0 | 0 | 5 | 0 | 0 | 0 | 0 | $I_{3,B}$ | | 0 | 0 | 5 | 0 | 0 | 0 | 0 |
| $I_{1,C}$ | | 0 | 0 | 5 | 0 | 0 | 0 | 0 | $I_{3,C}$ | | 0 | 0 | 5 | 0 | 0 | 0 | 0 |
| $I_{1,D}$ | | 0 | 0 | 5 | 0 | 0 | 0 | 0 | $I_{3,D}$ | | 0 | 0 | 5 | 0 | 0 | 0 | 0 |
| $I_{1,E}$ | | 0 | 0 | 5 | 5 | 0 | 0 | 0 | $I_{3,E}$ | | 0 | 0 | 5 | 5 | 0 | 5 | 0 |
| $I_{1,F}$ | | 0 | 0 | 0 | 0 | 0 | 0 | 0 | $I_{3,F}$ | | 0 | 0 | 0 | 0 | 0 | 0 | 0 |
| $I_{4,0}$ | $P_{2,0}$ | 1 | 2 | 0 | 0 | 0 | 0 | 2 | $I_{6,0}$ | | 1 | 2 | 0 | 0 | 0 | 0 | 0 |
| $I_{4,1}$ | | 0 | 0 | 0 | 0 | 0 | 0 | 0 | $I_{6,1}$ | | 0 | 0 | 0 | 0 | 0 | 0 | 0 |
| $I_{4,2}$ | | 0 | 0 | 0 | 0 | 0 | 0 | 0 | $I_{6,2}$ | | 0 | 0 | 0 | 0 | 0 | 0 | 0 |
| $I_{4,3}$ | | 0 | 0 | 1 | 0 | 0 | 0 | 0 | $I_{6,3}$ | | 0 | 0 | 1 | 0 | 0 | 0 | 0 |
| $I_{4,4}$ | $P_{2,1}$ | 0 | 0 | 1 | 0 | 0 | 0 | 4 | $I_{6,4}$ | | 0 | 0 | 1 | 0 | 0 | 0 | 0 |
| $I_{4,5}$ | | 0 | 0 | 1 | 0 | 0 | 0 | 0 | $I_{6,5}$ | | 0 | 0 | 1 | 0 | 0 | 0 | 0 |
| $I_{4,6}$ | | 0 | 0 | 1 | 1 | 0 | 1 | 0 | $I_{6,6}$ | | 0 | 0 | 1 | 1 | 0 | 2 | 0 |
| $I_{4,7}$ | | 0 | 0 | 3 | 0 | 0 | 0 | 0 | $I_{6,7}$ | | 0 | 0 | 3 | 0 | 0 | 0 | 0 |
| $I_{4,8}$ | $P_{2,2}$ | 0 | 0 | 3 | 0 | 0 | 0 | 6 | $I_{6,8}$ | | 0 | 0 | 3 | 0 | 0 | 0 | 0 |
| $I_{4,9}$ | | 0 | 0 | 3 | 0 | 0 | 0 | 0 | $I_{6,9}$ | | 0 | 0 | 3 | 0 | 0 | 0 | 0 |
| $I_{4,A}$ | | 0 | 0 | 3 | 3 | 0 | 3 | 0 | $I_{6,A}$ | | 0 | 0 | 3 | 3 | 0 | 4 | 0 |
| $I_{4,B}$ | | 0 | 0 | 5 | 0 | 0 | 0 | 0 | $I_{6,B}$ | | 0 | 0 | 5 | 0 | 0 | 0 | 0 |
| $I_{4,C}$ | $P_{2,3}$ | 0 | 0 | 5 | 0 | 0 | 0 | 8 | $I_{6,C}$ | | 0 | 0 | 5 | 0 | 0 | 0 | 0 |
| $I_{4,D}$ | | 0 | 0 | 5 | 0 | 0 | 0 | 0 | $I_{6,D}$ | | 0 | 0 | 5 | 0 | 0 | 0 | 0 |
| $I_{4,E}$ | | 0 | 0 | 5 | 5 | 0 | 5 | 0 | $I_{6,E}$ | | 0 | 0 | 5 | 5 | 0 | 6 | 0 |
| $I_{4,F}$ | | 0 | 0 | 0 | 0 | 0 | 0 | 0 | $I_{6,F}$ | | 0 | 0 | 0 | 0 | 0 | 0 | 0 |
| $I_{5,0}$ | | 1 | 2 | 0 | 0 | 0 | 0 | 0 | $I_{7,0}$ | | 1 | 1 | 0 | 0 | 0 | 0 | 0 |
| $I_{5,1}$ | | 0 | 0 | 0 | 0 | 0 | 0 | 0 | $I_{7,1}$ | | 0 | 0 | 0 | 0 | 0 | 0 | 0 |

TABLE I-continued

| OUTPUT PIXEL ($I_M$) $I_{ROW,COL}$ | INPUT PIXEL | J | K | L | M | N | P | Q |
|---|---|---|---|---|---|---|---|---|
| $I_{5,2}$ | | 0 | 0 | 0 | 0 | 0 | 0 | 0 |
| $I_{5,3}$ | | 0 | 0 | 1 | 0 | 0 | 0 | 0 |
| $I_{5,4}$ | | 0 | 0 | 1 | 0 | 0 | 0 | 0 |
| $I_{5,5}$ | | 0 | 0 | 1 | 0 | 0 | 0 | 0 |
| $I_{5,6}$ | | 0 | 0 | 1 | 1 | 0 | 1 | 0 |
| $I_{5,7}$ | | 0 | 0 | 3 | 0 | 0 | 0 | 0 |
| $I_{5,8}$ | | 0 | 0 | 3 | 0 | 0 | 0 | 0 |
| $I_{5,9}$ | | 0 | 0 | 3 | 0 | 0 | 0 | 0 |
| $I_{5,A}$ | | 0 | 0 | 3 | 3 | 0 | 3 | 0 |
| $I_{5,B}$ | | 0 | 0 | 5 | 0 | 0 | 0 | 0 |
| $I_{5,C}$ | | 0 | 0 | 5 | 0 | 0 | 0 | 0 |
| $I_{5,D}$ | | 0 | 0 | 5 | 0 | 0 | 0 | 0 |
| $I_{5,E}$ | | 0 | 0 | 5 | 5 | 0 | 5 | 0 |
| $I_{5,F}$ | | 0 | 0 | 0 | 0 | 0 | 0 | 0 |
| $I_{8,0}$ | $P_{3,0}$ | 1 | 1 | 0 | 0 | 0 | 0 | 1 |
| $I_{8,1}$ | | 0 | 0 | 0 | 0 | 0 | 0 | 0 |
| $I_{8,2}$ | | 0 | 0 | 0 | 0 | 0 | 0 | 0 |
| $I_{8,3}$ | | 0 | 0 | 1 | 0 | 0 | 0 | 0 |
| $I_{8,4}$ | $P_{3,1}$ | 0 | 0 | 1 | 0 | 0 | 0 | 3 |
| $I_{8,5}$ | | 0 | 0 | 1 | 0 | 0 | 0 | 0 |
| $I_{8,6}$ | | 0 | 0 | 1 | 1 | 0 | 2 | 0 |
| $I_{8,7}$ | | 0 | 0 | 3 | 0 | 0 | 0 | 0 |
| $I_{8,8}$ | $P_{3,2}$ | 0 | 0 | 3 | 0 | 0 | 0 | 5 |
| $I_{8,9}$ | | 0 | 0 | 3 | 0 | 0 | 0 | 0 |
| $I_{8,A}$ | | 0 | 0 | 3 | 3 | 0 | 4 | 0 |
| $I_{8,B}$ | | 0 | 0 | 5 | 0 | 0 | 0 | 0 |
| $I_{8,C}$ | $P_{3,3}$ | 0 | 0 | 5 | 0 | 0 | 0 | 7 |
| $I_{8,D}$ | | 0 | 0 | 5 | 0 | 0 | 0 | 0 |
| $I_{8,E}$ | | 0 | 0 | 5 | 5 | 0 | 6 | 0 |
| $I_{8,F}$ | | 0 | 0 | 0 | 0 | 0 | 0 | 0 |
| $I_{9,0}$ | | 1 | 1 | 0 | 0 | 0 | 0 | 0 |
| $I_{9,1}$ | | 0 | 0 | 0 | 0 | 0 | 0 | 0 |
| $I_{9,2}$ | | 0 | 0 | 0 | 0 | 0 | 0 | 0 |
| $I_{9,3}$ | | 0 | 0 | 1 | 0 | 0 | 0 | 0 |
| $I_{9,4}$ | | 0 | 0 | 1 | 0 | 0 | 0 | 0 |
| $I_{9,5}$ | | 0 | 0 | 1 | 0 | 0 | 0 | 0 |
| $I_{9,6}$ | | 0 | 0 | 1 | 1 | 0 | 2 | 0 |
| $I_{9,7}$ | | 0 | 0 | 3 | 0 | 0 | 0 | 0 |
| $I_{9,8}$ | | 0 | 0 | 3 | 0 | 0 | 0 | 0 |
| $I_{9,9}$ | | 0 | 0 | 3 | 0 | 0 | 0 | 0 |
| $I_{9,A}$ | | 0 | 0 | 3 | 3 | 0 | 4 | 0 |
| $I_{9,B}$ | | 0 | 0 | 5 | 0 | 0 | 0 | 0 |
| $I_{9,C}$ | | 0 | 0 | 5 | 0 | 0 | 0 | 0 |
| $I_{9,D}$ | | 0 | 0 | 5 | 0 | 0 | 0 | 0 |
| $I_{9,E}$ | | 0 | 0 | 5 | 5 | 0 | 6 | 0 |
| $I_{9,F}$ | | 0 | 0 | 0 | 0 | 0 | 0 | 0 |
| $I_{C,0}$ | $P_{0,0}$ | 1 | 2 | 0 | 0 | 0 | 0 | 9 |
| $I_{C,1}$ | | 0 | 0 | 0 | 0 | 0 | 0 | 0 |
| $I_{C,2}$ | | 0 | 0 | 0 | 0 | 0 | 0 | 0 |
| $I_{C,3}$ | | 0 | 0 | 1 | 0 | 0 | 0 | 0 |
| $I_{C,4}$ | $P_{0,1}$ | 0 | 0 | 1 | 2 | 1 | 0 | 0 |
| $I_{C,5}$ | | 0 | 0 | 1 | 0 | 0 | 0 | 0 |
| $I_{C,6}$ | | 0 | 0 | 1 | 1 | 0 | 1 | 0 |
| $I_{C,7}$ | | 0 | 0 | 3 | 0 | 0 | 0 | 0 |
| $I_{C,8}$ | $P_{0,2}$ | 0 | 0 | 3 | 4 | 1 | 0 | 0 |
| $I_{C,9}$ | | 0 | 0 | 3 | 0 | 0 | 0 | 0 |
| $I_{C,A}$ | | 0 | 0 | 3 | 3 | 0 | 3 | 0 |
| $I_{C,B}$ | | 0 | 0 | 5 | 0 | 0 | 0 | 0 |
| $I_{C,C}$ | $P_{0,3}$ | 0 | 0 | 5 | 6 | 1 | 0 | 0 |
| $I_{C,D}$ | | 0 | 0 | 5 | 0 | 0 | 0 | 0 |
| $I_{C,E}$ | | 0 | 0 | 5 | 5 | 0 | 5 | 0 |
| $I_{C,F}$ | | 0 | 0 | 0 | 0 | 0 | 0 | 0 |
| $I_{D,0}$ | | 1 | 2 | 0 | 0 | 0 | 0 | 0 |
| $I_{D,1}$ | | 0 | 0 | 0 | 0 | 0 | 0 | 0 |
| $I_{D,2}$ | | 0 | 0 | 0 | 0 | 0 | 0 | 0 |
| $I_{D,3}$ | | 0 | 0 | 1 | 0 | 0 | 0 | 0 |
| $I_{D,4}$ | | 0 | 0 | 1 | 0 | 0 | 0 | 0 |
| $I_{D,5}$ | | 0 | 0 | 1 | 0 | 0 | 0 | 0 |
| $I_{D,6}$ | | 0 | 0 | 1 | 1 | 0 | 1 | 0 |
| $I_{D,7}$ | | 0 | 0 | 3 | 0 | 0 | 0 | 0 |
| $I_{D,8}$ | | 0 | 0 | 3 | 0 | 0 | 0 | 0 |
| $I_{D,9}$ | | 0 | 0 | 3 | 0 | 0 | 0 | 0 |
| $I_{D,A}$ | | 0 | 0 | 3 | 3 | 0 | 3 | 0 |
| $I_{D,B}$ | | 0 | 0 | 5 | 0 | 0 | 0 | 0 |
| $I_{D,C}$ | | 0 | 0 | 5 | 0 | 0 | 0 | 0 |
| $I_{D,D}$ | | 0 | 0 | 5 | 0 | 0 | 0 | 0 |
| $I_{D,E}$ | | 0 | 0 | 5 | 5 | 0 | 5 | 0 |
| $I_{7,2}$ | | 0 | 0 | 0 | 0 | 0 | 0 | 0 |
| $I_{7,3}$ | | 0 | 0 | 1 | 0 | 0 | 0 | 0 |
| $I_{7,4}$ | | 0 | 0 | 1 | 0 | 0 | 0 | 0 |
| $I_{7,5}$ | | 0 | 0 | 1 | 0 | 0 | 0 | 0 |
| $I_{7,6}$ | | 0 | 0 | 1 | 1 | 0 | 2 | 0 |
| $I_{7,7}$ | | 0 | 0 | 3 | 0 | 0 | 0 | 0 |
| $I_{7,8}$ | | 0 | 0 | 3 | 0 | 0 | 0 | 0 |
| $I_{7,9}$ | | 0 | 0 | 3 | 0 | 0 | 0 | 0 |
| $I_{7,A}$ | | 0 | 0 | 3 | 3 | 0 | 4 | 0 |
| $I_{7,B}$ | | 0 | 0 | 5 | 0 | 0 | 0 | 0 |
| $I_{7,C}$ | | 0 | 0 | 5 | 0 | 0 | 0 | 0 |
| $I_{7,D}$ | | 0 | 0 | 5 | 0 | 0 | 0 | 0 |
| $I_{7,E}$ | | 0 | 0 | 5 | 5 | 0 | 6 | 0 |
| $I_{7,F}$ | | 0 | 0 | 0 | 0 | 0 | 0 | 0 |
| $I_{4,0}$ | | 1 | 1 | 0 | 0 | 0 | 0 | 0 |
| $I_{4,1}$ | | 0 | 0 | 0 | 0 | 0 | 0 | 0 |
| $I_{4,2}$ | | 0 | 0 | 0 | 0 | 0 | 0 | 0 |
| $I_{4,3}$ | | 0 | 0 | 1 | 0 | 0 | 0 | 0 |
| $I_{4,4}$ | | 0 | 0 | 1 | 0 | 0 | 0 | 0 |
| $I_{4,5}$ | | 0 | 0 | 1 | 0 | 0 | 0 | 0 |
| $I_{4,6}$ | | 0 | 0 | 1 | 1 | 0 | 1 | 0 |
| $I_{4,7}$ | | 0 | 0 | 3 | 0 | 0 | 0 | 0 |
| $I_{4,8}$ | | 0 | 0 | 3 | 0 | 0 | 0 | 0 |
| $I_{4,9}$ | | 0 | 0 | 3 | 0 | 0 | 0 | 0 |
| $I_{4,A}$ | | 0 | 0 | 3 | 3 | 0 | 3 | 0 |
| $I_{4,B}$ | | 0 | 0 | 5 | 0 | 0 | 0 | 0 |
| $I_{4,C}$ | | 0 | 0 | 5 | 0 | 0 | 0 | 0 |
| $I_{4,D}$ | | 0 | 0 | 5 | 0 | 0 | 0 | 0 |
| $I_{4,E}$ | | 0 | 0 | 5 | 5 | 0 | 5 | 0 |
| $I_{4,F}$ | | 0 | 0 | 0 | 0 | 0 | 0 | 0 |
| $I_{B,0}$ | | 1 | 2 | 0 | 0 | 0 | 0 | 0 |
| $I_{B,1}$ | | 0 | 0 | 0 | 0 | 0 | 0 | 0 |
| $I_{B,2}$ | | 0 | 0 | 0 | 0 | 0 | 0 | 0 |
| $I_{B,3}$ | | 0 | 0 | 1 | 0 | 0 | 0 | 0 |
| $I_{B,4}$ | | 0 | 0 | 1 | 0 | 0 | 0 | 0 |
| $I_{B,5}$ | | 0 | 0 | 1 | 0 | 0 | 0 | 0 |
| $I_{B,6}$ | | 0 | 0 | 1 | 1 | 0 | 1 | 0 |
| $I_{B,7}$ | | 0 | 0 | 3 | 0 | 0 | 0 | 0 |
| $I_{B,8}$ | | 0 | 0 | 3 | 0 | 0 | 0 | 0 |
| $I_{B,9}$ | | 0 | 0 | 3 | 0 | 0 | 0 | 0 |
| $I_{B,A}$ | | 0 | 0 | 3 | 3 | 0 | 3 | 0 |
| $I_{B,B}$ | | 0 | 0 | 5 | 0 | 0 | 0 | 0 |
| $I_{B,C}$ | | 0 | 0 | 5 | 0 | 0 | 0 | 0 |
| $I_{B,D}$ | | 0 | 0 | 5 | 0 | 0 | 0 | 0 |
| $I_{B,E}$ | | 0 | 0 | 5 | 5 | 0 | 5 | 0 |
| $I_{B,F}$ | | 0 | 0 | 0 | 0 | 0 | 0 | 0 |
| $I_{E,0}$ | | 1 | 2 | 0 | 0 | 0 | 0 | 0 |
| $I_{E,1}$ | | 0 | 0 | 0 | 0 | 0 | 0 | 0 |
| $I_{E,2}$ | | 0 | 0 | 0 | 0 | 0 | 0 | 0 |
| $I_{E,3}$ | | 0 | 0 | 1 | 0 | 0 | 0 | 0 |
| $I_{E,4}$ | | 0 | 0 | 1 | 0 | 0 | 0 | 0 |
| $I_{E,5}$ | | 0 | 0 | 1 | 0 | 0 | 0 | 0 |
| $I_{E,6}$ | | 0 | 0 | 1 | 0 | 0 | 0 | 0 |
| $I_{E,7}$ | | 0 | 0 | 3 | 0 | 0 | 0 | 0 |
| $I_{E,8}$ | | 0 | 0 | 3 | 0 | 0 | 0 | 0 |
| $I_{E,9}$ | | 0 | 0 | 3 | 0 | 0 | 0 | 0 |
| $I_{E,A}$ | | 0 | 0 | 3 | 0 | 0 | 0 | 0 |
| $I_{E,B}$ | | 0 | 0 | 5 | 0 | 0 | 0 | 0 |
| $I_{E,C}$ | | 0 | 0 | 5 | 0 | 0 | 0 | 0 |
| $I_{E,D}$ | | 0 | 0 | 5 | 0 | 0 | 0 | 0 |
| $I_{E,E}$ | | 0 | 0 | 5 | 0 | 0 | 0 | 0 |
| $I_{E,F}$ | | 0 | 0 | 0 | 0 | 0 | 0 | 0 |
| $I_{F,0}$ | | 1 | 0 | 0 | 0 | 0 | 0 | 0 |
| $I_{F,1}$ | | 0 | 0 | 0 | 0 | 0 | 0 | 0 |
| $I_{F,2}$ | | 0 | 0 | 0 | 0 | 0 | 0 | 0 |
| $I_{F,3}$ | | 0 | 0 | 1 | 0 | 0 | 0 | 0 |
| $I_{F,4}$ | | 0 | 0 | 1 | 0 | 0 | 0 | 0 |
| $I_{F,5}$ | | 0 | 0 | 1 | 0 | 0 | 0 | 0 |
| $I_{F,6}$ | | 0 | 0 | 1 | 0 | 0 | 0 | 0 |
| $I_{F,7}$ | | 0 | 0 | 3 | 0 | 0 | 0 | 0 |
| $I_{F,8}$ | | 0 | 0 | 3 | 0 | 0 | 0 | 0 |
| $I_{F,9}$ | | 0 | 0 | 3 | 0 | 0 | 0 | 0 |
| $I_{F,A}$ | | 0 | 0 | 3 | 0 | 0 | 0 | 0 |
| $I_{F,B}$ | | 0 | 0 | 5 | 0 | 0 | 0 | 0 |
| $I_{F,C}$ | | 0 | 0 | 5 | 0 | 0 | 0 | 0 |
| $I_{F,D}$ | | 0 | 0 | 5 | 0 | 0 | 0 | 0 |
| $I_{F,E}$ | | 0 | 0 | 5 | 0 | 0 | 0 | 0 |

TABLE I-continued

| OUTPUT PIXEL ($I_M$) | INPUT PIXEL | POSITIONS OF SWITCHES | | | | | | OUTPUT PIXEL ($I_M$) | INPUT PIXEL | POSITIONS OF SWITCHES | | | | | |
|---|---|---|---|---|---|---|---|---|---|---|---|---|---|---|---|
| $I_{ROW,COL}$ | | J | K | L | M | N | P | Q | $I_{ROW,COL}$ | | J | K | L | M | N | P | Q |
| $I_{D,F}$ | | 0 | 0 | 0 | 0 | 0 | 0 | 0 | $I_{F,F}$ | | 0 | 0 | 0 | 0 | 0 | 0 | 0 |

4. A frame initial condition circuit which comprises a multiply-by-four ($\times 4$) circuit 140 serially coupled to a frame initial condition (IC) register 141.

As shown in FIG. 20, the $\times 4$ circuit 140 is also coupled in series with the $\div 4$ circuit 129 in vertical gradient generator 123 when switch Q is in position 9. By including the $\times 4$ circuit 140 in series with the $\div 4$ circuit 129, the amplitude of received pixel $P_{0,0}$ is essentially unchanged. The $\times 4$ circuit 140 multiplies the data applied thereto ($P_{0,0}$)/4 by 4 by merely left-shifting the data two bit-places.

Frame IC register 141 stores $P_{0,0}$ as the initial intensity ($I_{0,0}$) condition for a new frame or picture.

5. Vertical gradient (V.G.) registers 143 and 145. Register 143 is the V.G. register for odd macro rows (MR's) and register 145 is the V.G. register for even macro rows (MR's).

Vertical gradient registers 143 and 145 selectively store the vertical gradient information that is generated by the vertical gradient generator 123 for the left-hand side of a frame or picture.

6. A two dimensional gradient generator comprised of two-dimensional gradient (2DG) registers 151–156 and a divide-by-four ($\div 4$) circuit 157.

Registers 151–156 selectively store the two dimensional gradient information (e.g. ($I_1-I_2-I_3+I_4$)/4 that is generated by the vertical gradient generator 123. Registers 151, 153 and 155 store information for the macro cells in odd-numbered macro rows (MR's) of macro columns (MC's) 1, 2 and 3, respectively. Registers 152, 154 and 156 store information for the macro cells in even-numbered macro rows (MR's) of macro columns (MC's) 1, 2 and 3, respectively.

The $\div 4$ circuit 157, which is similar to the $\div 4$ circuits 126 and 129, is used to convert the two-dimensional gradient information that is selectively received from registers 151–156 into two dimensional gradients (e.g., ($I_1-I_2-I_3+I_4$)/$4^2$). The two-dimensional gradients from the $\div 4$ circuit 157 are selectively used to update the horizontal gradients stored in the registers 131, 133 and 135, whenever a different horizontal line of intensity points is being generated.

7. Line initial condition (IC) accumulator 161, comprised of the combination of a register 163, coupled between a first input and the output of a summer or combiner 165.

The line IC accumulator 161 generates the initial intensity of a row or line by incrementing the initial intensity of the previous row or line by the associated vertical gradient along the left-hand side of the frame or picture.

8. Horizontal gradient (H.G.) accumulator 167, comprised of the combination of a register 169 coupled between a first input and the output of a summer or combiner 171.

The H.G. accumulator 167 generates the proper intensity for an output pixel ($I_M$) by incrementing the stored intensity of the previous output pixel by the associated horizontal gradient.

9. A summer or combiner 159 for summing two-dimensional gradients from the $\div 4$ circuit 157 with the horizontal gradient information from switch L in order to update the horizontal gradients for the following line of intensity points.

In the further discussion of the structure and operation of the function generator of FIG. 20, FIGS. 13 and 14 and TABLE 1 will be selectively referred to. TABLE 1 specifically shows the steady state cyclic operation of the switches J, K, L, M, N, P and Q for enabling the system to generate (in a raster scan fashion) sequential frames of output pixels $I_{0,0}$ ... $I_{F,F}$ (indicated in FIG. 13) relative to the times that the received pixels $P_{0,0}$ ... $P_{3,3}$ are strobed out of the FIFO 115.

The horizontal gradient generator 121 is coupled between the output of the FIFO 115 and position 1 of switch N. The generator 121 comprises a delay register 124 coupled between the positive and negative inputs of a subtractor or combiner 125, with the output of the subtractor being coupled to a divide-by-four ($\div 4$) circuit 126. Delay register 124 is reset (by, for example the first, fifth, ninth and thirteenth strobe pulses out of the ROM 119) to a "zero" initial condition (I.C.) at the start of each of the four FIFO 115 output lines or rows of received pixels (e.g. $P_{0,0}$ ... $P_{0,3}$; $P_{1,3}$; $P_{2,0}$ ... $P_{2,3}$; $P_{3,0}$ ... $P_{3,3}$). Register 124 has a delay time equal to the time between a pair of adjacent received pixels from the FIFO 115 in a horizontal line (e.g. the time between the pair of received pixels $P_{0,0}$ and $P_{0,1}$ in a horizontal line (e.g. the time between the pair of received pixels $P_{0,0}$ and $P_{0,1}$ in horizontal row or line 2 of FIG. 15). In this manner the intensity difference between adjacent horizontal pixels in row 2 (e.g., $P_{0,1}-P_{0,0}$, $P_{0,2}-P_{0,1}$, $P_{0,3}-P_{0,2}$) is developed at the output of the subtractor 125.

Since, as shown in FIG. 13, there are 4 increments between, for example, adjacent horizontal pixels $P_{0,0}$ and $P_{0,1}$, the $\div 4$ circuit 126 develops the horizontal gradient between each pair of adjacent received pixels (($P_{0,1}-P_{0,0}$)/4, ($P_{0,2}-P_{0,1}$)/4 and ($P_{0,3}-P_{0,2}$)/4) across the top edge (of each of rows or lines 0, 1 and 2) of the picture of FIG. 13. The circuit 126 provides a division by 4 by merely right-shifting the amplitude difference from subtractor 125 by two bit-places.

The vertical gradient generator 123 is coupled between the output of subtractor 125 and the movable pole of switch Q. The generator 123 comprises a delay register 127 coupled between the positive and negative inputs of a subtractor or combiner 128, with the output of the subtractor 128 being coupled to a divide-by-four ($\div 4$) circuit 129. Delay register 127 is reset (by, for example, the first strobe pulse out of the ROM 119) to a "zero" initial condition (I.C.) at the start of each frame output from the FIFO 115 (at the time $P_{0,0}$ is strobed out of the FIFO 115). Register 127 has a 4-line (or 4 row) delay time equal to the time between received pixels from the FIFO 115 in a vertical column of FIG.

13. For example, a 4-line delay time exists between received pixel $P_{0,0}$ (in row 2) and received pixel $P_{1,0}$ (in row 6 of FIG. 13. In this manner, the intensity difference between adjacent vertical pixels in column 2 (e.g., $P_{1,0}-P_{0,0}$, $P_{2,1}-P_{1,0}$, $P_{3,0}-P_{2,0}$) is developed at the subtractor 128. Since, as shown in FIG. 13, there are 4 increments between, for example, adjacent vertical pixels $P_{0,0}$ and $P_{1,0}$, the $\div 4$ circuit 129 develops the vertical gradient between each pair of adjacent received pixels (($P_{1,0}-P_{0,0})/4$, $(P_{2,0}-P_{1,0})/4$, $(P_{3,0}-P_{2,0})/4$) along the left-hand side (of each of columns 0, 1 and 2) of the pattern in FIG. 13. The circuit 129 provides a division by 4 by merely right-shifting the amplitude difference from subtractor 128 by two bit-places.

Vertical gradient generator 123 also provides two-dimensional gradient information (e.g., $(I_1-I_2-I_3+I_4)/4$) from which two-dimensional gradients (e.g., $(I_1-I_2-I_3+I_4)/4^2$ of equation (4)) are derived to update the horizontal gradients (developed by generator 121) whenever a different horizontal line of intensity points is to be generated.

It has been previously assumed, as well as shown in FIGS. 15 and 16, that there are 4 horizontal and 4 vertical increments in each of the macro cells $C_{1,1}$ ... $C_{3,3}$. If more horizontal and vertical increments were desired in each macro cell, then more intensity points would have to be computed between each of the horizontal and vertical pairs of adjacent received pixels (P's). As a consequence, each of the circuits 126 and 129 would have to perform a larger division of the amplitude of input data. For example, if 8 increments (instead of 4) were used between adjacent received horizontal pixels (e.g., $P_{0,0}$ and $P_{0,1}$) and between adjacent received vertical pixels (e.g. $P_{0,0}$ and $P_{1,0}$), the circuits 126 and 129 would have to be divide-by-eight ($\div 8$) circuits in order to respectively develop the proper horizontal and vertical gradients. In the event that the circuits 126 and 129 were $\div 8$ circuits, the multiplier 140 would have to be a multiply-by-eight ($\times 8$) circuit. Division by a $\div 8$ circuit would result by merely right-shifting input data amplitude three bit-places, while multiplication by a $\times 8$ circuit would result by merely left-shifting input data amplitude three bit-places.

The selective utilization of the input pixels ($P_{0,0}$ ... $P_{3,3}$) by the function generator of FIG. 20 to generate and store the initial frame intensity ($I_{0,0}$), the horizontal gradients across the tops of the exemplary macro columns (1, 2 and 3), the vertical gradients along the extreme left-hand sides of the exemplary macro rows (1, 2 and 3), and the two dimensional gradient (2 DG) information for the exemplary macro cells ($C_{1,1}$ ... $C_{3,3}$) will now be discussed.

The first pixel $P_{0,0}$ being strobed out of the FIFO 115 is applied to the inputs of the delay register 124 and the subtractor 125 in the horizontal gradient generator 121. As indicated before, delay register 124 is reset to zero before the start of each line and delay register 127 is reset to zero at the start of a frame. Thus, at the time of pixel $P_{0,0}$ there is no output of the delay register 124 being applied to the subtractor 125 and no output of the delay register 127 being applied to the subtractor 128. As a result, pixel $P_{0,0}$ is passed directly through subtractors 125 and 128, $\div 4$ circuit 129, position 9 of switch Q (see TABLE 1), $\times 4$ circuit 140 and stored in frame IC register 141. By including the $\times 4$ circuit 140 in series with the $\div 4$ circuit 129, the amplitude of pixel $P_{0,0}$ is essentially unchanged.

At the time that pixel $P_{0,1}$ is strobed out of the FIFO 115 and applied to the inputs of delay register 124 and subtractor 125, the first pixel $P_{0,0}$ is being applied from the output of register 124 to the subtracting input of subtractor 125. Thus, at the time of $P_{0,1}$ the output of the $\div 4$ circuit 126 is the horizontal gradient $(P_{0,1}-P_{0,0})/4$ across the top of macro cell $C_{1,1}$. This horizontal gradient $(P_{0,1}-P_{0,0})/4$, as shown in Table 1, is applied through position 1 of switch N, position 2 of switch M and stored in register 132. Register 132 is used to store the initial condition (IC) of the horizontal gradient for macro column (MC) 1. In a like manner, at the time of $P_{0,2}$, the horizontal gradient $(P_{0,2}-P_{0,1})/4$ across the top of macro cell $C_{1,2}$ is generated by horizontal gradient generator 121, applied through position 1 of switch N and position 4 of switch M, and stored in register 134. Similarly, at the time of $P_{0,3}$, the horizontal gradient $(P_{0,3}-P_{0,2})/4$ across the top of macro cell $C_{1,3}$ is developed by generator 121, passed through position 1 of switch N and position 6 of switch M, and stored in register 136. Registers 134 and 136 are used to selectively store the initial conditions of the horizontal gradients for macro columns 2 and 3, respectively.

It will be recalled that register 124 is reset to zero before the start of each line of FIG. 13. Therefore, as shown in FIG. 13 and TABLE 1, $P_{1,0}$ is passed from FIFO 115 through subtractor 125 to subtractor 128 at the same time that $P_{0,0}$ is applied from the output of the 4-line delay register 127 to the subtracting input of subtractor 128. As a result, at the time of $P_{1,0}$ the output of $\div 4$ circuit 129 in vertical gradient generator 123 is the vertical gradient $(P_{1,0}-P_{0,0})/4$ along the left-hand side of macro cell $C_{1,1}$. This vertical gradient $P_{1,0}-P_{0,0}$, as shown in TABLE 1, is applied through position 1 of switch Q and stored in vertical gradient register 143. Register 143 is used to sequentially store the vertical gradient along the left-hand side of each of the odd-numbered macro rows (1 and 3 in this exemplary description).

At the time of $P_{1,1}$, the output of subtractor 125 in horizontal gradient generator 121 is $P_{1,1}-P_{1,0}$ and the output of delay register 127, which is applied to the subtracting input of subtractor 128 in vertical gradient generator 123, is $P_{0,1}-P_{0,0}$ (which has been delayed by 4 lines). Therefore, at the time of $P_{1,1}$ the output of the $\div 4$ circuit 129 is the two-dimensional gradient (2 DG) information $(P_{0,0}-P_{0,1}-P_{1,0}+P_{1,1})/4$ for macro cell $C_{1,1}$. As shown in TABLE 1, this 2 DG information for macro cell $C_{1,1}$ is applied through position 3 of switch Q and stored in 2 DG register 151. Register 151 is used to selectively store the 2 DG information for the macro cells in the odd macro rows (MR's) in macro column (MC) 1. In a like manner, after $P_{1,2}$ is strobed out of FIFO 115, 2 DG information $(P_{0,1}-P_{0,2}-P_{1,1}+P_{1,2})/4$ for macro cell $C_{1,2}$ is developed by vertical gradient generator 123, passed through position 5 of switch Q and stored in 2 DG register 153. Register 153 is used to selectively store the 2 DG information for the macro cells in the odd macro rows (MR's) in macro column (MC) 2. Similarly, at the time of $P_{1,3}$, 2 DG information $(P_{0,2}-P_{0,3}-P_{1,2}+P_{1,3})/4$ for macro cell $C_{1,3}$ is developed by vertical gradient generator 123, passed through position 7 of switch Q and stored in 2 DG register 155. Register 155 is used to selectively store the 2 DG information for the macro cells in the odd macro rows (MR's) in macro column (MC) 3.

TABLE 1 and FIGS. 13, 14 and 20 likewise indicate that at the respective times that $P_{2,0}$, $P_{2,1}$, $P_{2,2}$ and $P_{2,3}$ are sequentially strobed out of the FIFO 115, the vertical gradient along the left-hand side of macro cell $C_{2,1}$ and the 2 DG information signals for macro cells $C_{2,1}$, $C_{2,2}$ and $C_{2,3}$ are selectively generated by the vertical gradient generator 123 and respectively stored in registers 145, 152, 154 and 156 (by way of the respective switch Q positions 2, 4, 6 and 8). It should be noted that when switch Q is in its 0 position, no data is being loaded into any of the registers 141, 143, 145 and 151–156.

Register 145 is used to selectively store the vertical gradient along the left-hand side of each of the even-numbered macro rows (2 in this exemplary description). Registers 152, 154 and 156 are used to selectively store the 2DG information signals for the macro cells in the even macro rows in macro columns 1, 2 and 3 (i.e. $C_{2,1}$, $C_{2,2}$ and $C_{2,3}$ in this exemplary description).

Similarly, at the times that the input pixels $P_{3,0}$, $P_{3,1}$, $P_{3,2}$ and $P_{3,3}$ are sequentially strobed out of the FIFO 115, the vertical gradient along the left-hand side of macro cell $C_{3,1}$ and the 2 DG information signals for macro cells $C_{3,1}$, $C_{3,2}$ and $C_{3,3}$ are selectively generated by the vertical gradient generator 123 and respectively stored in VG register 143 and 2 DG registers 151, 153 and 155 (by way of the respective switch Q positions 1, 3 5 and 7).

As discussed above, the selective utilization of the input pixels ($P_{0,0}$ ... $P_{3,3}$) by the system of FIG. 20 to generate and store the initial frame intensity ($I_{0,0}$), the horizontal gradients across the tops of macro columns 1, 2 and 3, the vertical gradients along the left-hand sides of macro rows 1, 2 and 3, and the 2 D gradient information for macro cells $C_{1,1}$ ... $C_{3,3}$ is summarized in the following TABLE 2.

veloped by line IC accumulator 161 from the information stored in registers 141, 143 and 145.

The initial intensity for the first line or row (row 0), and hence for the entire frame or picture (FIG. 13), is the intensity of the first received pixel $P_{0,0}$, which is stored in frame initial condition (IC) register 141. As indicated before, delay register 124 is zeroed at the start of each FIFO 115 output line, and delay register 127 is zeroed at the start of the FIFO 115 output frame. Thus, as shown in FIG. 13 and TABLE 1, the first received pixel $P_{0,0}$ (which is the initial intensity for the next frame) is passed directly through subtractors 125 and 128, $\div 4$ circuit 129, position 9 of switch Q, $\div 4$ circuit 140 and stored in frame IC register 141 at the same time that output pixel $I_{C,0}$ is being generated for the present frame. As shown in TABLE 1 and FIG. 20, there is a time delay between the times of reception and utilization of an input pixel to generate an associated output pixel for each of the received pixels. By including the $\times 4$ circuit 140 in series with the $\div 4$ circuit 129, the intensity amplitude of pixel $P_{0,0}$ is essentially unchanged.

When the system of FIG. 20 is ready to start using $P_{0,0}$, $P_{0,0}$ is passed through position 3 of switch K and stored in the line IC accumulator 161. As stated before the line IC accumulator 161 is comprised of the parallel-coupled register 163 and summer 165. In operation, the register 163 is reset to a "zero" initial condition at the start of the I frame output (before $P_{0,0}$ is developed as the first output pixel $I_{0,0}$ in the frame). At the same time that $P_{0,0}$ is stored in the accumulator, $P_{0,0}$ is also passed out of the accumulator 161, through position 1 of switch J into the H.G. accumulator 167.

At the beginning of each new line or row of FIG. 13,

TABLE 2

| Output Pixel | Input Pixel | $\div 4$ Circuit 126 | | $\div 4$ Circuit 129 | |
|---|---|---|---|---|---|
| | | Output | Stored in | Output | Stored in |
| $I_{C,0}$ | $P_{0,0}$ | $P_{0,0}$ only | | $P_{0,0}$ only | Register 141 |
| $I_{C,4}$ | $P_{0,1}$ | Horiz. grad. across top of MC #1 (Cell $C_{1,1}$) | Register 132 | | |
| $I_{C,8}$ | $P_{0,2}$ | Horiz. grad. across top of MC #2 (Cell $C_{1,2}$) | Register 134 | | |
| $I_{C,C}$ | $P_{0,3}$ | Horiz. grad. across top of MC #3 (Cell $C_{1,3}$) | Register 136 | | |
| $I_{0,0}$ | $P_{1,0}$ | $P_{1,0}$ only | | Vert. grad. of left-hand side of MR #1 | Register 143 |
| $I_{0,4}$ | $P_{1,1}$ | Horiz. grad. across bottom of Cell $C_{1,1}$ | | 2 D grad. info. in Cell $C_{1,1}$ | Register 151 |
| $I_{0,8}$ | $P_{1,2}$ | Horiz. grad. across bottom of Cell $C_{1,2}$ | | 2 D grad. info. in Cell $C_{1,2}$ | Register 153 |
| $I_{0,C}$ | $P_{1,3}$ | Horiz. grad. across bottom of Cell $C_{1,3}$ | | 2 D grad. info. in Cell $C_{1,3}$ | Register 155 |
| $I_{4,0}$ | $P_{2,0}$ | $P_{2,0}$ only | | Vert. grad. of left-hand side of MR #2 | Register 145 |
| $I_{4,4}$ | $P_{2,1}$ | Horiz. grad. across bottom of Cell $C_{2,1}$ | | 2 D grad. info. in Cell $C_{2,1}$ | Register 152 |
| $I_{4,8}$ | $P_{2,2}$ | Horiz. grad. across bottom of Cell $C_{2,2}$ | | 2 D grad. info. in Cell $C_{2,2}$ | Register 154 |
| $I_{4,C}$ | $P_{2,3}$ | Horiz. grad. across bottom of Cell $C_{2,3}$ | | 2 D grad. info. in Cell $C_{2,3}$ | Register 156 |
| $I_{8,0}$ | $P_{3,0}$ | $P_{3,0}$ only | | Vert. grad. of left-hand side of MR #3 | Register 143 |
| $I_{8,4}$ | $P_{3,1}$ | Horiz. grad. across bottom of Cell $C_{3,1}$ | | 2 D grad. info. in Cell $C_{3,1}$ | Register 151 |
| $I_{8,8}$ | $P_{3,2}$ | Horiz. grad. across bottom of Cell $C_{3,2}$ | | 2 D grad. info. in Cell $C_{3,2}$ | Register 153 |
| $I_{8,C}$ | $P_{3,3}$ | Horiz. grad. across bottom of Cell $C_{3,3}$ | | 2 D grad. info. in Cell $C_{3,3}$ | Register 155 |

The generation of the initial intensity conditions for the lines or rows 0, 1 ... 9, A ... F of FIG. 13 will now be discussed. These initial intensity conditions are developed before, delay register 124 is zeroed at the start the initial intensity of the previous line must be updated to determine the initial intensity for a new line. As discussed above, there is a zero (0) vertical gradient between lines 0 and 1, and between lines 1 and 2. The initial intensity of line 1 is derived by updating the initial intensity of line 0 ($I_{0,0}$). This updating operation entails adding a 0 vertical gradient from grounded position 0 of switch K to the initial intensity of line 0 ($I_{0,0}$) that was stored in the accumulator 161. In a like manner, the initial condition of line 2 is derived by updating the initial intensity of line 1, by adding the 0 vertical gradient from position 0 of switch K to the initial intensity of line 1 that was stored in the accumulator 161. Hence, the initial intensity for each of lines 1 and 2 is the same as it was for line 0, namely $I_{0,0}$, the initial intensity for the frame.

For the start of line 3, the initial intensity of line 2 is updated or incremented by the vertical gradient information for the extreme left-hand side of macro row 1. It should be recalled that the vertical gradient for the odd macro rows (1 and 3) on the left-hand side of the picture is selectively stored in V.G. register 143, while the vertical gradient for the even macro rows on the left-hand side of the picture is selectively stored in V.G. register 145. By simultaneously examining TABLE 1 and FIG. 20, it can be seen that the intensity information stored in the line IC accumulator 161 is incremented by the vertical gradient applied from register 143 (through position 2 of switch K) at the start of each of lines 3, 4, 5 and 6 in macro row 1; by the vertical gradient applied from register 145 (through position 1 of switch K) at the start of each of lines 7, 8, 9 and A in macro row 2; and by the vertical gradient applied from register 143 (through position 2 of switch K) at the start of each of lines B, C, D and E in macro row 3. Since there also is zero (0) vertical gradient between lines E and F, line F has the same initial intensity as line E had, namely that of $I_{E,0}$. When switch K is in position 0, the line initial intensity information stored in accumulator 161 remains unchanged, since that initial intensity information is incremented by the 0 vertical gradient from position 0 of switch K.

In the above manner, each line of computed intensity points will always be started with the proper intensity. This vertical gradient updating operation for incrementing the initial intensity of the previous line by the vertical gradient along the left-hand side of the picture is shown in equation (6). Thus, as discussed before, the initial (vertical gradient) conditions of macro column 0 for equation (6) are found in registers 143 and 145.

Each of the initial intensities ($I_{0,0}$, $I_{1,0}$, $I_{2,0}$, $I_{3,0}$, $I_{4,0}$, $I_{5,0}$, $I_{6,0}$, $I_{7,0}$, $I_{8,0}$, $I_{9,0}$, $I_{A,0}$, $I_{B,0}$, $I_{C,0}$, $I_{D,0}$, $I_{E,0}$ and $I_{F,0}$) developed in line IC accumulator 161 for lines 0, 1 ... 9, A ... F is selectively passed through position 1 of switch J into the H.G. accumulator 169. At all other times switch J is in position 0 to enable the H.G. accumulator 169 to increment the initial line intensities by the horizontal gradient information applied from switch L, as a horizontal line of output intensity points is being computed.

A central element in the function generator of FIG. 20 is the H.G. accumulator 167, which is comprised of the register 169 and summer or combiner 171. At the beginning of each of the horizontal lines 0, 1 ... 9, A ... F (FIG. 1) the register 169 is reset to zero and an associated one of the new initial intensities ($I_{0,0}$, $I_{1,0}$, $I_{2,0}$, $I_{3,0}$, $I_{4,0}$, $I_{5,0}$, $I_{6,0}$, $I_{7,0}$, $I_{8,0}$, $I_{9,0}$, $I_{A,0}$, $I_{B,0}$, $I_{C,0}$, $I_{D,0}$, $I_{E,0}$ and $I_{F,0}$), developed in line IC accumulator 161 for lines 0, 1 ... A ... F, is selectively passed through position 1 of switch J and stored (by way of summer 171) in the register 169 of H.G. accumulator 167. The output of the summer 171 is also the $I_M$ output pixel of the function generator of FIG. 20.

A second input to the summer 171 is the horizontal gradient information of the picture (FIG. 13) that is applied from switch L when switch J is in position 0. As indicated before, switch J is only in position 1 at the start of each new line in order to pick up the initial intensity for that new line. At all other times switch J is in position 0.

This horizontal gradient information is applied from switch L, through position 0 of switch J to the summer 171. With each increase in the x-position of a horizontal line across a macro column, the accumulator 167 increments once to add in the summer 171 the horizontal gradient to the previous output intensity or pixel $I_M$ presently stored in the register 169 in order to develop a different output intensity or pixel (see $I_M$ in TABLE 1) for that new x-position. This different output intensity from the summer 171 is then stored in register 169 to update that register.

Switch L is fed by H.G. registers 131–136, but normally by one of the working registers 131, 133 and 135. Taking FIGS. 13 and 20 together, it can be seen in the extreme left-hand borders of macro columns 0 and 4 that there is a zero (0) horizontal gradient information in x. This is due to the fact that each of macro columns 0 and 4 contains only 1-point data or information about the left-hand side of that macro column. Therefore, there can only be a 0 horizontal gradient in either of macro coumns 0 and 4. Consequently, as shown in TABLE 1, switch L will be in grounded position 0 (to pick up the 0 horizontal gradient) whenever columns 0, 1 and 2 in macro column 1 and column F in macro column 4 are being shaded in. As a result, the intensity points in columns 0, 1 and 2 of any given horizontal line or row of FIG. 13 will all have the same intensity. Also, since the intensity point in column F of any given horizontal line is unchanged, it will have the same intensity as the intensity point in column E of that horizontal line.

After a horizontal line of intensity points is shaded in across macro column 0, switch L moves to its position 2 to pick up from register 132 the proper initial condition or initial horizontal gradient value for macro column 1. This initial condition of macro column 1 is fed from register 132, through position 2 of switch L and position 0 of switch J to summer 171 in the accumulator 167. At the same time, this initial condition of macro column 1 from position 2 of switch L is looped back around through summer 159, position 0 of switch N and position 1 of switch M, and stored in working H.G. register 131 for macro column 1. Register 132 is simply a means for picking up the initial condition for the start of a horizontal line through macro column 1, while register 131 is the working register in macro column 1 whenever intensity points are being computed in macro column 1.

As the horizontal gradient information from register 131 is being used (by way of position 1 of which L) in shading in intensity points across macro column 1 for the rest of the frame or picture, the horizontal gradient generator 121 will subsequently determine the initial (horizontal gradient) condition for macro column 1 in the next frame. That information will be computed by the generator 121, applied through position 1 of switch N and position 2 of switch M, and stored in register 132 when input pixel $P_{0,1}$ is strobed out of the FIFO 115.

So registers 131 and 132 comprise a register pair for serving macro column 1. In a similar manner, registers 133 and 134 comprise a register pair for use in macro column 2, and registers 135 and 136 comprise a register pair for use in macro column 3. Hence a register pair is used with each of the macro columns 1, 2 and 3. Note that, since macro columns 0 and 4 are border columns which have zero (0) horizontal gradients, macro columns 0 and 4 do not require register pairs. As indicated in TABLE 1, the initial (horizontal gradient) conditions for macro columns 2 and 3 in the next frame are computed by generator 121 applied through position 1 of switch N, selectively applied through position 4 and 6 of switch M, and respectively stored in registers 134 and 136 at the respective times that input pixels $P_{0,2}$ and $P_{0,3}$ are strobed out of the FIFO 115. It should be noted at this time that switch N is in position 1 only when, as previously described, horizontal gradients are being generated at the times when input pixels $P_{0,1}$, $P_{0,2}$ and $P_{0,3}$ are being strobed out of the FIFO 115. At all other times, switch N is in position 0.

The horizontal gradient across macro column 1 is constant. Therefore, a constant input to summer 171 is applied from position 1 of switch L by way of position 0 of switch J.

When the border that exists between macro column 1 and macro column 2 is reached, the following operations occur. Register 131 is updated so that it will have the proper horizontal gradient for the next horizontal row or line. The register 131 is updated by combining in adder 159 the horizontal gradient output of register 131 from position 1 of switch L with the 2D gradient (for the odd macro rows in macro column 1) from $\div 4$ circuit 157. This 2D gradient (which is passed from register 151, through position 1 of switch P and through the $\div 4$ circuit 157) corresponds to the second partial derivative of equation (7) and is used to update the horizontal gradient from register 131. In a similar manner, as indicated in TABLE 1, the 2D gradient information stored in registers 152–156 (for the remaining even and odd macro rows of macro columns 1, 2 and 3) is selectively fed out of the registers 152–156 through the $\div 4$ circuit 157 by way of the respective positions 2–6 of switch P to selectively update the horizontal gradients stored in the H.G. registers 131, 133 and 135. When switch P is in position 0, no horizontal gradients in registers 131, 133 and 135 are being updated. Thus, the horizontal gradient for a given line across a given macro column is updated at the completion of each macro column in order to develop the horizontal gradient for the following line across that given macro column.

The new sum (or updated horizontal gradient) at the output of summer 159, which is given by equation (5), is passed through position 0 of switch N and position 1 of switch M for storage in register 131. In this manner, register 131 is properly updated for the next horizontal line of intensity points that is to be computed across macro column 1. By adding the update information from the $\div 4$ circuit 157 (by way of register 151) to the old horizontal gradient output from register 131 and storing this new sum back into register 131, the second partial derivative information shown in equation (7) is integrated one step with respect to the variable y. Then subsequently, when the updated horizontal gradient is read out of register 131 through position 1 of switch L and position 0 of switch J into the H.G. accumulator 167, there is a second integration with respect to the variable x which generates the proper intensity for the output pixel from summer 171.

It has been previously discussed how the horizontal gradients across the tops of macro columns 1, 2 and 3 have been developed and stored in IC H.G. registers 132, 134 and 136 (at the respective times that $P_{0,1}$, $P_{0,2}$ and $P_{0,3}$ are strobed out of the FIFO 115). It will now be explained how those initial horizontal gradients are used in relation to horizontal line 0.

After the intensity points in line 0 (e.g. $I_{0,0}$, $I_{0,1}$, $I_{0,2}$) have been computed across macro column 0 and macro column 1 is entered, switch L is moved to position 2 to read out from register 132 the proper initial horizontal gradient condition for macro column 1. This initial condition of macro column 1 is fed from register 132 to the summer 171 in the accumulator 167 by way of position 2 of switch L and position 0 of switch J to increment the accumulator 167 by the horizontal gradient at the next x-position in macro column 1 (when $I_{0,3}$ is generated). This initial horizontal gradient condition of macro column 1 is also fed back from position 2 of switch L through summer 159, position 0 of switch N and position 1 of switch M and stored in working register 131 for macro column 1. Across each x-position in line 0 across the rest of macro column 1, a constant input to the summer 171 is applied from working register 131 through position 1 of switch L and position 0 of switch J.

After the intensity points in line 0, (e.g. $I_{0,3}$, $I_{0,4}$, $I_{0,5}$, $I_{0,6}$) have been computed across macro column 1 and macro column 2 is entered, switch L is moved to position 4 to read out from register 134 the proper initial horizontal gradient condition for macro column 2. This initial condition of macro column 2 is fed from register 134 to the summer 171 in the accumulator 167 by way of position 4 of switch L and position 0 of switch J to increment the accumulator 167 by the horizontal gradient at the next x position in macro column 2. This initial condition of macro column 2 is also fed back from position 4 of switch L through summer 159, position 0 of switch N and position 3 of switch M, and stored in working register 133 for macro column 2. Across each x-position in line 0 across the rest of macro column 2, a constant input to summer 171 is applied from working register 133 through position 3 of switch L and position 0 of switch J.

When a horizontal line of intensity points is to be computed across macro column 3 in output line 0, the proper initial horizontal gradient for macro column 3 is read out of register 136, applied through position 6 of switch L and position 0 of switch J to the summer 171 in the accumulator 167. This initial condition is also fed back from position 6 of switch L through summer 159, position 0 of switch N and position 5 of switch M, and stored in working register 135 for macro column 3. Across the rest of macro column 3, a constant input to summer 171 is applied from working register 135 through position 5 of switch L and position 0 of switch J. In this manner, registers 136 and 135 are used in conjunction with the accumulator 167 to compute the output intensity points or pixels (e.g. $I_{0,B}$, $I_{0,C}$, $I_{0,D}$, $I_{0,E}$) in line 0 across macro column 3. When switch M is in its position 0, no new data is stored or restored into any of the registers 131–136.

Notice that when a line of points of output line 0 (as well as output lines 1–9 and A–F) is in macro column 4, there is once again a zero (0) horizontal gradient, since macro column 4 only contains 1-point data information about the left-hand side of that macro column. Therefore, switch L reverts back to its 0 or grounded position for the last output pixel in column F of macro column 4 (e.g. $I_{0,F}$). When switch L is in position 0 (in columns 0, 1, 2 and F of each line, a 0 horizontal gradient is applied to H.G. accumulator 167.

Since, as discussed before, there is no vertical gradient between lines 0 and 1 and between lines 1 and 2, the intensity points computed across lines 1 and 2 will be identical to the previously computed intensity points in the corresponding x-positions across line 0.

After each portion of each of the horizontal lines 2–9 and A–E of intensity points (I's) has been selectively computed through each of the macro columns, the associated one of the horizontal gradients in the registers 131, 133 and 135 is updated for the next horizontal line. As discussed before, this updating of the horizontal gradients entails the selective utilization of the two-dimensional gradient signals (or the second partial differential information of equation (7)) from registers 151 and 152 to update the horizontal gradient for macro column 1, from registers 153 and 154 to update the horizontal gradient for macro column 2, and from registers 155 and 156 to update the horizontal gradient for macro column 3. The 2 DG registers 151–156, like the H.G. registers 131–136, are arranged in three pairs, with one pair for each of macro columns 1, 2 and 3. Within any given pair of the registers 151–156, one register is used with odd macro rows in an associated macro column, while the other register is used with even macro rows in the associated macro column. As indicated in TABLE 1, only one of the registers 151–156 is used at any given time — to either store or read out 2 DG information. Therefore, one register of a pair cannot disturb the other register of the pair.

It will now be shown how the horizontal gradient for each of the macro columns 1, 2 and 3 in line 2 is selectively updated after a line of intensity points is computed across each of the macro columns. When intensity points are being computed in line 2 (for example) of macro row 1, the information for the selective updatings of macro columns 1, 2 and 3 in macro row 1 are respectively stored in registers 151, 153 and 155.

A horizontal gradient for a macro column (1, 2 or 3) is updated in preparation for the next pass through that macro column, but on the next line. It will be recalled that a horizontal gradient is updated as a function of the vertical gradient. From TABLE 1 and FIG. 1, it can be seen that there is a 0 vertical gradient between lines 0 and 1, between lines 1 and 2, and between lines E and F. However, there is a vertical gradient between, for example, lines 2 and 3. Hence, each horizontal gradient through a macro column in line 2 is updated to obtain the proper horizontal gradient through that macro column in line 3. To illustrate this, the updating of each of the horizontal gradients associated with macro columns 1, 2 and 3 along line 2 (in macro row 1) will now be explained to show how the updated horizontal gradients are respectively derived for use along line 3 through macro columns 1, 2 and 3. After the line of intensity points ($I_{2,2}$, $I_{2,3}$, $I_{2,4}$, $I_{2,5}$, $I_{2,6}$) has been computed along line 2 across macro column 1, the horizontal gradient stored in register 131 for macro column 1 along line 2 is updated for subsequent use for macro column 1 along line 3. In accomplishing this horizontal gradient update (at the time that $I_{2,6}$ is being generated), the content of register 151 is divided by four by the ÷4 circuit 157, summed in summer 159 with the content of H.G. register 131 and then the resultant sum is stored in register 131.

It should be noted at this time that each new sum (or updated horizontal gradient) at the output of the summer 159 is given by equation (5).

After the line of intensity points along line 2 and across macro column 2 has been completed (when $I_{2,A}$ is being generated) the horizontal gradient stored in register 133 is updated for subsequent use in line 3 across macro column 2. This update is accomplished (at the time $I_{2,A}$ is being generated) by summing the content of register 153 (by way of the ÷4 circuit 157) with the content of register 133 and placing that resultant sum in the register 133. Similarly, after the line of intensity points along line 2 and across macro column 3 has been completed, the horizontal gradient content of register 135 is updated (at the time $I_{2,E}$ is being generated) by summing it with the content of register 155 (by way of the ÷4 circuit 157) and placing the resultant sum in the register 135.

After intensity points have been computed for a line in macro row 2 (line 6, for example) and across macro column 1, the H.G. content of register 131 is updated at the time $I_{6,6}$ is being generated by summing the H.G. register 131 content with the 2 DG gradient update content of register 152 (by way of ÷4 circuit 157) and storing the sum in register 131. Similarly, when intensity points have been computed for line 6 across macro column 2 (macro column 3), the H.G. content of register 133 (register 135) is updated at the time $I_{6,A}$ ($I_{6,E}$) is being generated by summing the H.G. register content with the 2 DG update content of register 154 (register 156) (by way of ÷4 circuit 157) and storing the resultant sum in register 133 (register 135).

So, the 2 DG register pairs are used in the formation of the second partial derivative of equation (7), with registers 151 and 152 for macro column 1, registers 153 and 154 for macro column 2, and registers 155 and 156 for macro column 3. No register pairs are needed for either of macro columns 0 and 4, as indicated before, because there is a zero (0) horizontal gradient across each of them.

The generation and storage of the initial intensity condition of the frame or picture (of FIG. 13), the horizontal gradients, the vertical gradients and the two-dimensional gradients have been discussed above in detail. All of these signals are selectively utilized by the function generator of FIG. 20, as previously discussed, in the generation of the sequence of output pixels ($I_M$), $I_{0,0}$...$I_{F,F}$ of TABLE 1, at the output of the summer 171. Each of the output pixels ($I_M$) from the summer 171 satisfies the requirements of equation (4) in that it is comprised of the sum of four terms: the initial intensity $I_{0,0}$ of the frame from register 141; the vertical gradient from registers 143 and 145 incremented in y-position in the accumulator 161 in order to update the initial intensity $I_{0,0}$ of the frame to give the initial intensity of each line; and the combination of the horizontal gradients from registers 131–136 and the two dimensional gradients (incremented in y-position) from the registers 151–156 by way of ÷4 circuit 157, the combination being incremented in x-position in the accumulator 167.

In view of the foregoing, it is deemed unnecessary to present further detail on the generation of each one of the output pixels ($I_M$), including those of exemplary Table I. The timing and operation of the switches J, K, L, M, N, P and Q and circuits of FIG. 20 in conjunction with TABLES 1 and 2 have been explained in detail. In addition, the generation of the four terms common to each output pixel, as well as of some of the output pixels, have been discussed in detail in relation to the function generator of FIG. 20. Therefore, from an examination of the instruction set of TABLE 1 and FIGS. 13 and 20, it should be readily apparent to those skilled in the art how the remaining pixels of TABLE 1 are developed at the output of the summer 171 by double linear interpolation.

The invention thus provides a system (and method) for substantially increasing the dynamic range of an input sequence of pixels representative of an image wherein a first circuit is responsive to the input sequence of pixels for developing bias parameters and gain parameters which are respectively utilized by first and second function generators to generate bias and gain correction signals, respectively. A delay circuit synchronizes, by way of a second path, the input sequence of pixels to the bias and gain correction signals. A combiner expands in a first direction the range of contrast of the synchronized input sequence of pixels as a function of the bias correction signals to produce a first contrast expanded sequence of pixels. An output circuit expands in a second direction the range of contrast of the first contrast expanded sequence of pixels as a function of the gain correction signals. Thus, the output circuit develops an output sequence of pixels which has a substantially increased dynamic range of contrast in comparison with that of the input sequence of pixels.

While the salient features have been illustrated and described in a preferred embodiment of the invention, it should be readily apparent to those skilled in the art that modifications can be made within the spirit and scope of the invention as set forth in the appended claims.

We claim:

1. A system comprising:
    non-multiplicative first means responsive to an input sequence of pixels representative of an image for digitally developing bias parameters and gain parameters; and
    second means responsive to the input sequence of pixels and to the bias and gain parameters for substantially increasing the dynamic range of the input sequence of pixels, said second means comprising:
        first and second function generators respectively responsive to the bias and gain parameters for respectively developing pixel bias correction signals and pixel gain correction signals;
        third means selectively responsive to the input sequence of pixels and to the pixel bias correction signals for producing a substantially minimized sequence of pixels; and
        fourth means selectively responsive to the substantially minimized sequence of pixels and to the pixel gain correction signals for developing an output enhanced sequence of pixels in which the dynamic range of contrast has been substantially expended in comparison with that of the input sequence of pixels.

2. The system of claim 1 wherein said third means comprises:
    a delay circuit for synchronizing the input sequence of pixels to the pixel bias correction signals and pixel gain correction signals, respectively; and
    a combiner responsive to the synchronized input sequence of pixels and to the pixel bias correction signals for producing the substantially minimized sequence of pixels.

3. A system comprising:
    means for developing an input sequence of pixels representative of an image;
    means responsive to the input sequence of pixels for selectively generating bias parameters and gain parameters;
    a first function generator for converting the bias parameters into pixel bias correction signals;
    a second function generator for converting the gain parameters into pixel gain correction signals;
    means for delaying the input sequence of pixels to synchronize said input sequence of pixels with the pixel bias correction signals and the pixel gain correction signals, respectively;
    means for respectively subtracting the pixel bias correction signals from the delayed input sequence of pixels to produce a substantially minimized sequence of pixels; and
    means responsive to the substantially minimized sequence of pixels and to the pixel gain correction signals for developing an output sequence of pixels which has a substantially increased dynamic range in comparison with that of the input sequence of pixels.

4. A system comprising:
    means responsive to an input sequence of pixels representative of an image for developing bias and gain parameters, said input sequence of pixels having a dynamic range;
    first function generating means responsive to the bias parameters for developing pixel bias correction signals;
    second function generating means responsive to the gain parameters for developing pixel gain correction signals;
    means responsive to the input sequence of pixels for providing a delayed input sequence of pixels which is respectively in synchronization with associated ones of each of the pixel bias correction signals and of each of the pixel gain correction signals;
    means for respectively subtracting the pixel bias correction signals from the delayed sequence of pixels to selectively reduce the minimum values of the delayed input sequence of pixels; and
    means responsive to the output of said subtracting means and to the pixel gain correction signals for generating an enhanced output which has a substantially expanded dynamic range in relation to the dynamic range of the input sequence of pixels.

5. A digital system for automatically varying the contrast of each of a plurality of local regions of a video display, said system comprising:
    first means responsive to a sequence of pixels representative of a video image for developing for each local region an associated effective minimum value and an associated effective gain parameter;
    second means selectively responsive to effective minimum values for generating pixel bias correction signals;
    third means selectively responsive to gain parameters for generating pixel gain correction signals;
    fourth means coupled to said first means for providing a delayed sequence of pixels respectively synchronized to each of the pixel bias and pixel gain correction signals;
    fifth means responsive to the delayed sequence of pixels and to the pixel bias correction signals for respectively expanding in a first direction the range of contrast in each of the plurality of local regions; and sixth means responsive to the contrast expanded sequence of pixels from said fifth means and to the pixel gain correction signals for respectively expanding in a second direction the range of contrast in each of the plurality of local regions.

6. A machine method for substantially increasing the dynamic range of contrast of an input sequence of pixels representative of an image, said method comprising the steps of:

developing bias parameters and gain parameters from the input sequence of pixels;

converting the bias parameters into pixel bias correction signals;

converting the gain parameters into pixel gain correction signals;

delaying the input sequence of pixels;

expanding in a first direction the range of contrast of the delayed input sequence of pixels as a function of the pixel bias correction signals to produce a first contrast expanded sequence of pixels; and expanding in a second direction the range of contrast of the first contrast expanded sequence of pixels as a function of the pixel gain corrected signals.

7. A machine method of video contrast expansion comprising the steps of:

developing first and second parameters from an input video signal; and increasing the dynamic range of contrast of the input video signal as a function of the first and second parameters.

8. The machine method of claim 7 wherein said increasing step comprises the steps of:

generating first correction signals as a function of the first parameters;

generating second correction signals as a function of the second parameters;

synchronizing the input video signal to each of the first and second correction signals;

combining the synchronized input video signal with the first correction signals to produce a first contrast expanded video signal in which the range of contrast is expanded in a first direction; and developing an output second contrast expanded video signal in which the range of contrast of the first contrast expanded signal is expanded in a second direction as a function of the second correction signals.

* * * * *